United States Patent
Prien et al.

(10) Patent No.: US 12,471,933 B2
(45) Date of Patent: Nov. 18, 2025

(54) TARGETING DEVICE FOR SCREW INSERTION IN DISTAL END OF BONE

(71) Applicant: Acumed LLC, Hillsboro, OR (US)

(72) Inventors: Ole Prien, Kiel (DE); Mark Sommers, Beaverton, OR (US); Brian Conley, Portland, OR (US); David VanVleet, Hillsboro, OR (US)

(73) Assignee: Acumed LLC, Hillsboro, OR (US)

( * ) Notice: Subject to any disclaimer, the term of this patent is extended or adjusted under 35 U.S.C. 154(b) by 460 days.

(21) Appl. No.: 17/699,611

(22) Filed: Mar. 21, 2022

(65) Prior Publication Data

US 2022/0296284 A1    Sep. 22, 2022

Related U.S. Application Data

(60) Provisional application No. 63/164,272, filed on Mar. 22, 2021.

(51) Int. Cl.
*A61B 17/17* (2006.01)
*A61B 17/72* (2006.01)
(Continued)

(52) U.S. Cl.
CPC ...... *A61B 17/1725* (2013.01); *A61B 17/7241* (2013.01); *A61B 17/7082* (2013.01);
(Continued)

(58) Field of Classification Search
CPC ................................................ A61B 17/1725
See application file for complete search history.

(56) References Cited

U.S. PATENT DOCUMENTS

| 5,234,434 A | * | 8/1993 | Goble | A61B 17/1714 |
| | | | | 606/88 |
| 5,620,449 A | * | 4/1997 | Faccioli | A61B 17/1725 |
| | | | | 606/98 |

(Continued)

FOREIGN PATENT DOCUMENTS

| CN | 212438803 U | 2/2021 |
| WO | WO 2022/204002 A1 | 9/2022 |

OTHER PUBLICATIONS

Preliminary International Search Report corresponding to related International Patent Application No. PCT/US2022/021106 mailed Oct. 5, 2023, 10 pages.

(Continued)

*Primary Examiner* — Nicholas W Woodall
(74) *Attorney, Agent, or Firm* — Knobbe, Martens, Olson & Bear, LLP

(57) ABSTRACT

The present application provides a new and innovative device for aiding in screw installation through a distal end of a nail installed in a patient's bone (e.g., humerus). The nail's distal end is disposed away from an insertion point of the nail into the bone. The targeting device includes a targeting body having an outer frame, a flexible member connected to the outer frame, a targeting block having multiple holes and connected to the flexible member such that the flexibility of the flexible member enables the targeting block to translate towards sides of the outer frame, and an adjustment assembly that adjusts and maintains the targeting block's position relative to the sides of the outer frame. The targeting device further includes a base plate removably coupled to the targeting body. The targeting device may be coupled to the nail at the base plate.

18 Claims, 20 Drawing Sheets

(51) Int. Cl.
*A61B 17/86* (2006.01)
*A61B 17/88* (2006.01)
A61B 17/70 (2006.01)
A61B 17/74 (2006.01)

(52) U.S. Cl.
CPC ............. *A61B 17/744* (2013.01); *A61B 17/86* (2013.01); *A61B 17/8875* (2013.01)

(56) References Cited

U.S. PATENT DOCUMENTS

| | | | | |
|---|---|---|---|---|
| 7,481,815 B2 * | 1/2009 | Fernandez | ......... | A61B 17/1725 606/97 |
| 8,414,584 B2 * | 4/2013 | Brigido | ............. | A61B 17/1775 606/86 R |
| 8,986,315 B2 * | 3/2015 | Durante | ............. | A61B 17/1725 606/96 |
| 2008/0039857 A1 | 2/2008 | Giersch et al. | | |
| 2012/0303037 A1 * | 11/2012 | Overes | ............... | A61B 17/1725 606/96 |
| 2012/0303038 A1 | 11/2012 | Durante et al. | | |

OTHER PUBLICATIONS

International Search Report corresponding to related International Patent Application No. PCT/US2022/021106 mailed Jun. 14, 2022, 3 pages.
International Written Opinion corresponding to related International Patent Application No. PCT/US2022/021106 mailed Jun. 14, 2022, 19 pages.
Extended European Search Report, re EP Application No. 22776382.8, dated Jan. 21, 2025.

* cited by examiner

TARGETING DEVICE FOR SCREW INSERTION IN DISTAL END OF BONE

PRIORITY CLAIM

The present application claims priority to and the benefit of U.S. Provisional Application 63/164,272, filed Mar. 22, 2021, the entirety of which is herein incorporated by reference.

BACKGROUND

Typical systems and methods for treating proximal humerus fractures, such as the Polarus 3 Solution surgical system offered commercially by Acumed®, include installing an array of plate and nail options in the humerus that help compress bone fragments together and promote healing. As part of installing a nail in the humerus, screws are installed into the bone and through holes in the nail. This process involves targeting the screws so that they go through the holes of the nail when the screws are driven into the humerus. Typically, screws installed in a proximal end of the humerus (e.g., near the shoulder) are targeted with and inserted through a targeting instrument. Screws installed into a distal end of the humerus (e.g., near the elbow), however, are typically targeted using the "free-hand technique" which involves a surgeon using fluoroscopy to align, by hand, a drill bit to nail holes visible on a fluoroscopy image. The screws are then driven into the drilled holes.

The "free-hand technique" can be challenging for some surgeons as it can be difficult to view a fluoroscopy image showing holes of a nail installed within a bone and at the same time line up a drill bit relative to the bone based on the fluoroscopy image so that the drill bit travels through a nail hole. Stated differently, there are many variables, such as the surgeon's arm, the drill bit, and a C-arm, that all need to be stabilized to accurately target the drill bit and it can be difficult to do so. Differences in anatomy among patients can also make the "free-hand technique" more challenging in some patients as compared to other patients. Accordingly, a need exists for a device that helps address the above drawbacks of typical systems and procedures for installing a nail and screws in a distal end of a humerus bone.

SUMMARY

The present application relates generally to bone fracture fixation. More specifically, the present application provides a targeting guide/device that aids the insertion of screws through a distal end of a nail installed in a bone, such as a humerus. When the nail is installed in the bone, the nail's proximal end is disposed near the insertion point where the nail was installed into the bone while the nail's distal end is disposed away from the insertion point. For example, when the nail is installed in the humerus, the nail's proximal end is disposed near the patient's shoulder and the nail's distal end is disposed away from the shoulder.

In an example, a targeting device includes a targeting body having an outer frame, a flexible member connected to the outer frame, a targeting block having multiple holes and connected to the flexible member such that the flexibility of the flexible member enables the targeting block to translate towards sides of the outer frame, and an adjustment assembly that adjusts and maintains the targeting block's position relative to the sides of the outer frame. The targeting device further includes a base plate removably coupled to the targeting body. The targeting device may be coupled to the nail at the base plate.

In another example, a system for installing a screw through a distal end of a nail installed in a bone of a patient includes the nail and the example targeting device described above. The nail includes a screw hole at the distal end of the nail.

In another example still, a method for installing a screw through a distal end of a nail installed in a bone of a patient includes installing the nail into the bone of the patient, the nail including a screw hole at the distal end of the nail. The example targeting device described above may be coupled to the proximal end of the nail. The coupled targeting device may be aligned with the aid of fluoroscopy such that one of the holes of the targeting block is targeted at the screw hole at the distal end of the nail. A bone hole may be drilled in the bone such that the drilled bone hole is aligned with the screw hole at the distal end of the nail. A screw may then be installed in the screw hole.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1A:
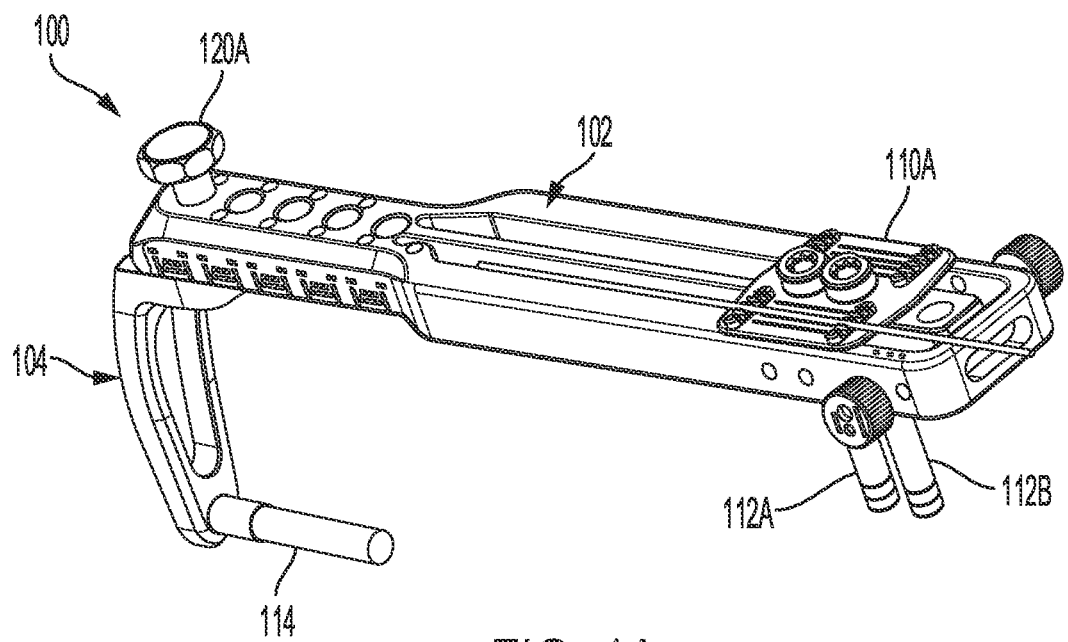
FIG. 1A illustrates a perspective view of a targeting device for aiding surgeons in targeting bone screws in the medial/lateral plane at a distal end of a nail installed in a humerus, according to an aspect of the present disclosure.

The present application provides a new and innovative device and method that help surgeons target screws for insertion in a distal end of a bone (e.g., a humerus) and through holes of a nail installed in the bone. A surgeon may first install a nail in a patient's bone. The provided targeting device can then be coupled to a proximal end of the installed nail. From this point, the surgeon can align the coupled targeting device with the installed nail so that the surgeon can drill bone holes, using the targeting device as a guide, that are concentric with the screw receiving holes located at the distal end of the installed nail. For instance, the provided targeting device includes a block having multiple holes that are each adapted to receive a cannula for guiding a drill bit. A surgeon can adjust the targeting device's orientation so that at least one hole in the block, and therefore the received drill bit-guiding cannula, is targeted at a screw receiving hole of the installed nail. In this way, when the surgeon advances a drill bit through the cannula and into the bone, the drill bit will generate a bone hole that leads to the screw receiving hole of the installed nail's distal end.

The provided targeting device may include any combination of various features described herein for aiding a surgeon in accurately and consistently targeting screws. In one example, screws are typically installed in the distal end of the installed nail in both the medial/lateral plane and the anterior/posterior plane. To help surgeons avoid potential mistakes regarding the medial/lateral plane versus the anterior/posterior plane, the provided targeting device may include removable inserts that indicate to the surgeon which plane the surgeon is targeting.

In another example, the provided targeting device may have components that improve upon the circle-circle technique. Surgeons typically apply the circle-circle technique when aligning a targeting instrument with radiopaque markers; however, the circle-circle technique requires moving a C-arm (e.g., fluoroscopy machine) in 3D-space through six axes, which can be difficult and time-consuming. In one aspect, the provided targeting device and method enable a surgeon to align an installed nail with one or more straight lines on a fluoroscopy image, which thereby eliminates two axes of freedom for precisely aligning the C-arm. In another aspect, the provided targeting device and method enable a surgeon to align radiopaque components embedded within the targeting device, which helps more accurately align the C-arm. In some aspects, targeting markers having a radiopaque portion may be used with the provided targeting device during alignment to help combat the parallax effects inherent to a C-arm. Further advantages will become apparent from the following description of the figures. Additionally, while the following description of the figures is described in connection with the humerus, this is merely exemplary and the provided targeting device may be used to target screws through a nail installed in any suitable bone (e.g., a long bone).

Figure 1B:
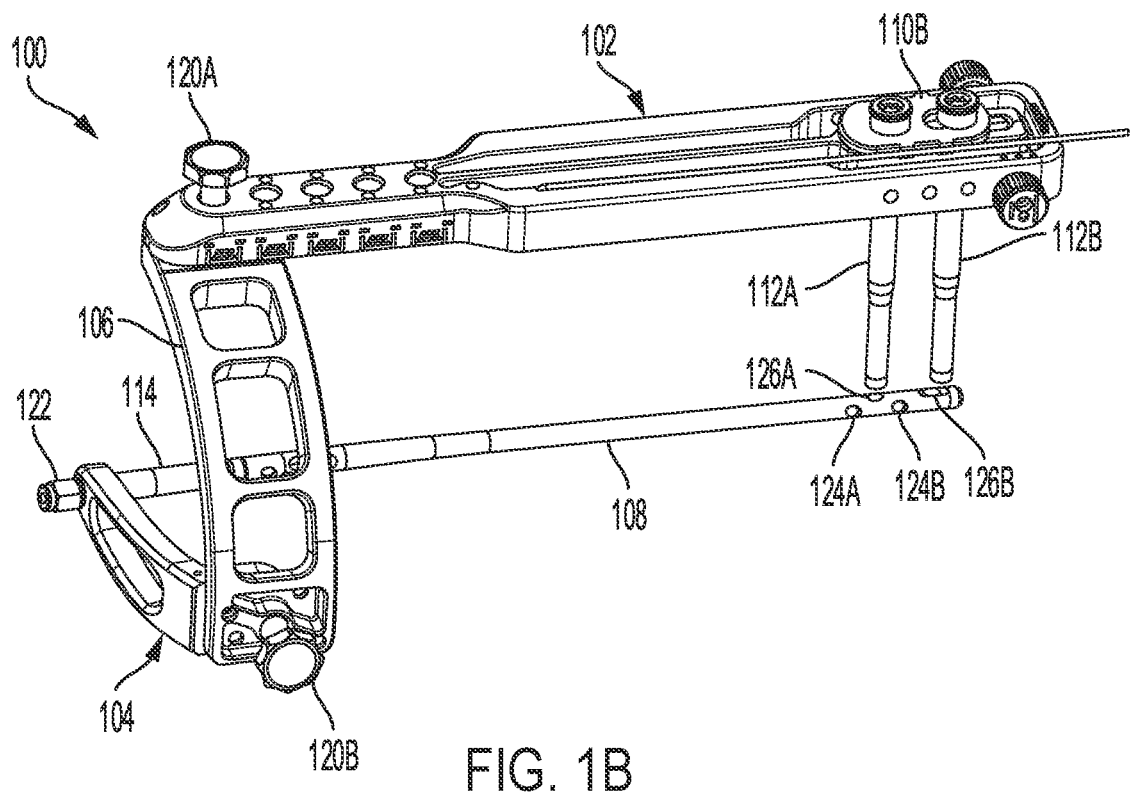
FIG. 1B illustrates a perspective view of the targeting device of FIG. 1A for aiding surgeons in targeting bone screws in the anterior/proximal plane at a distal end of a nail installed in a humerus, according to an aspect of the present disclosure.

FIGS. 1A and 1B illustrate perspective views of an example targeting device 100 that surgeons may use to align a drill bit with screw holes of a distal end of a nail installed within a bone (e.g., a humerus), thereby targeting bone screws for insertion into the screw holes of the nail. Bone screws inserted into the distal end of a nail installed with the humerus are typically inserted in two different planes, the anterior/posterior plane and the medial/lateral plane, which are perpendicular to one another. FIG. 1A illustrates a perspective view of an example arrangement of the targeting device 100 to aid surgeons in targeting bone screws in the medial/lateral plane, whereas FIG. 1B illustrates a perspective view of an example arrangement of the targeting device 100 to aid surgeons in targeting bone screws in the anterior/posterior plane.

In FIG. 1A, the example targeting device 100 includes a targeting body 102. A base plate 104 may be removably coupled to the targeting body 102. For instance, a body 506 (FIG. 5) of the base plate 104 may be coupled to the targeting body 102 via a threaded knob 120A and a bolt (not illustrated) at a connection hole 206 (FIG. 2) of the targeting body 102. The base plate 104 may be coupled to the targeting body 102 at any of the connection holes 206 to adjust for different nail lengths. In various aspects, the base plate 104 may include a connection tube 114 for removably coupling a nail to the base plate 104. In at least some aspects, the targeting device 100 may include a removable insert, such as the insert 110A and/or the insert 110B (FIG. 1B). The insert 110A and/or the insert 110B may correspond to whether the targeting device 100 is being used to target screws in the medial/lateral plane (e.g., the insert 110A) or in the anterior/posterior plane (e.g., the insert 110B), as described in more detail below.

In at least some aspects, the targeting device 100 may include one or more removable targeting cannulas 112A, 112B. The one or more targeting cannulas 112A, 112B may be positioned through cannula holes 400-406 (FIG. 4) of the targeting body 102, and in some instances through an insert 110A or 110B. When so positioned, the one or more targeting cannulas 112A, 112B help guide a drill bit once the targeting device 100 is aligned in a desired position.

As shown in FIG. 1B, when the example targeting device 100 is used to target bone screws in the anterior/posterior plane, the base plate 104 may be coupled to the targeting body 102 via a curved connector bow 106. For instance, one end 508 (FIG. 5) of a body 500 (FIG. 5) of the connector bow 106 may be removably coupled to the targeting body 102 and a second end 510 of the body 500 of the connector bow 106 may be removably coupled to the base plate 104. In an example, the end 508 of the connector bow 106 may be coupled to the targeting body 102 via the threaded knob 120A at a connection hole 206 (FIG. 2) of the targeting body 102. The connector bow 106 may be coupled to the targeting body 102 at any of the connection holes 206 to adjust for different nail lengths. In one example, the end 510 of the connector bow 106 may be coupled to the base plate 104 via a threaded knob 120B and a bolt (not illustrated). In the illustrated example of FIG. 1B, the targeting device 100 is configured to target a bone screw in the anterior/posterior plane of a humerus on the right side of a patient (e.g., FIG. 14). In another example, the targeting device 100 may be arranged with the connector bow 106 and the base plate 104 in mirror image positions as that shown in FIG. 1B, in order to target a bone screw in the anterior/posterior plane of a humerus on the left side of the patient.

For illustrative purposes, FIG. 1B also shows a nail 108 coupled to the connector tube 114 of the base plate 104. In at least some aspects, the nail 108 may be coupled to the connector tube 114 via a lag bolt 122. For instance, the lag bolt 122 may be positioned through the connector tube 114 and a threaded end 512 (FIG. 5) of the lag bolt 122 may be coupled to interior threading of the nail 108. The nail 108 may be coupled to the connecter tube 114 of the targeting device 100 shown in FIG. 1A in the same manner.

In at least some aspects, a distal end of the nail 108 includes the screw holes 124A and 124B. The screw holes 124A and 124B may be arranged on the nail 108 such that the screw holes 124A and 124B are in the medial/lateral plane when the nail 108 is installed in a humerus. In at least some aspects, the distal end of the nail 108 includes the screw holes 126A and 126B. The screw holes 126A and 126B may be arranged on the nail 108 such that the screw holes 126A and 126B are in the anterior/posterior plane when the nail 108 is installed in the humerus. As shown, the medial/lateral screw holes 124A, 124B and the anterior/posterior screw holes 126A, 126B are offset from one another along a length of the nail 108 so that screws may be inserted, if desired, through each of the screw holes 124A, 124B, 126A, and 126B at the same time. In some aspects, such as the one illustrated, the medial/lateral screw holes 124A, 124B may alternate with the anterior/posterior screw holes 126A, 126B. Stated differently, the screw hole 126A is between the screw holes 124A and 124B along the length of the nail 108, and the screw hole 124B is between the screw holes 126A and 126B along the length of the nail 108. In other aspects, the medial/lateral screw holes 124A, 124B may be grouped together and the anterior/posterior screw holes 126A, 126B may be grouped together such that they do not alternate.

Figure 5:
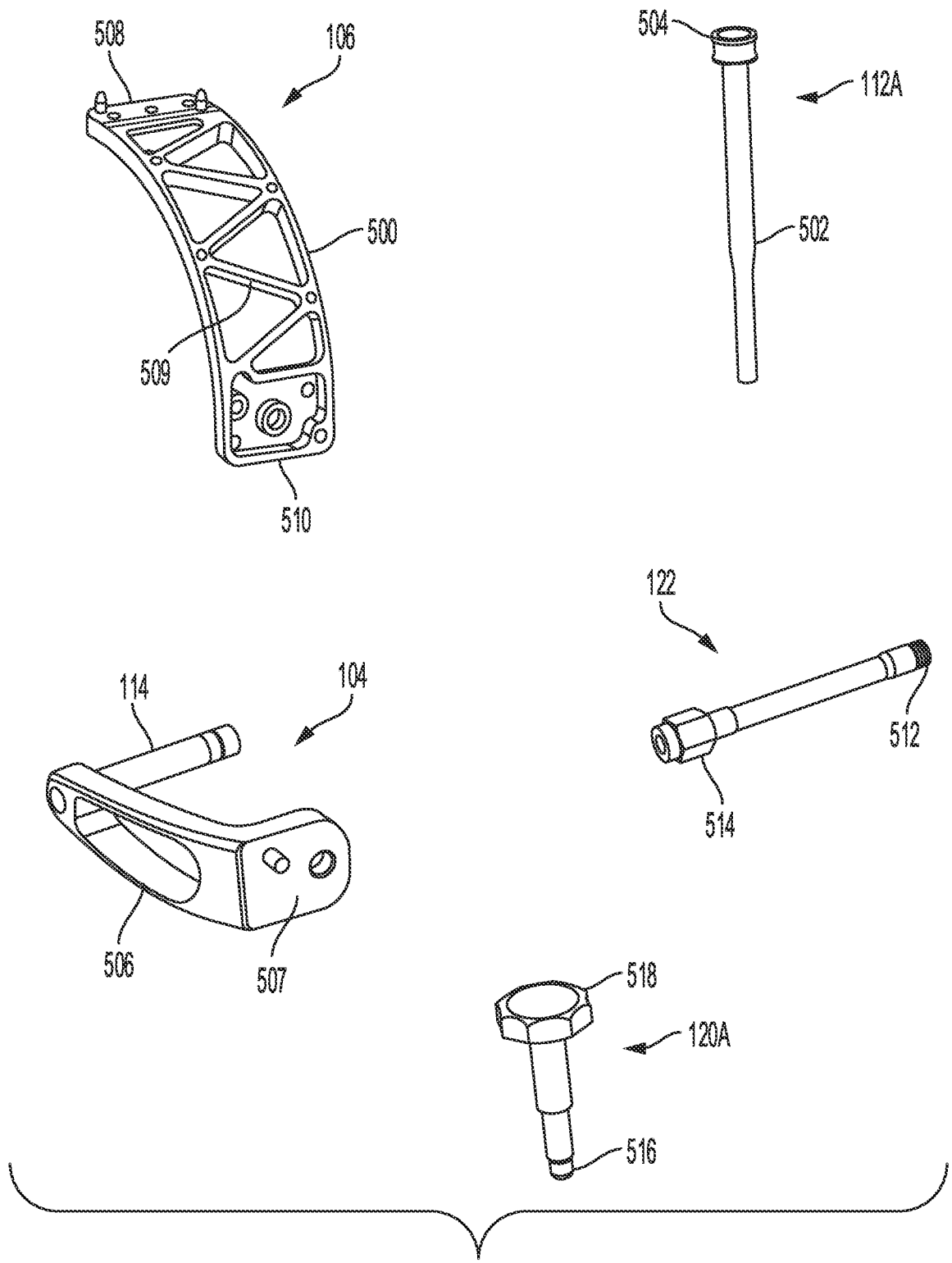
FIG. 5 illustrates perspective views of components of the targeting device of FIGS. 1A and 1B, according to an aspect of the present disclosure.

FIG. 5 illustrates various components of the targeting device 100. An example base plate 104 is shown having a body 506 with a connector tube 114 and an end portion 507. The end portion 507 of the base plate 104 may couple to the targeting body 102 (e.g., FIG. 1A) or to the connector bow 106 (e.g., FIG. 1B). An example connector bow 106 is shown having a body 500 with a first end 508 and a second end 510. The body 500 of the connector bow 106 may be curved. In some aspects, the body 500 of the connector bow 106 may include multiple crossbars 509 that help maintain the structural integrity of the body 500 while reducing the material needed for the body 500. In other aspects, the body 500 may have another suitable, curved structure. FIG. 5 also illustrates an example targeting cannula 112A having a tube 502 and a head 504. The head 504 of the targeting cannula 112A has a larger cross-sectional width/diameter than each of the cannula holes 400-406 of the targeting body 102 so that the head 504 does not translate through a respective cannula hole 400-406. The targeting cannula 112B may be identical to the targeting cannula 112A. An example lag bolt 122 is also shown having a shaft with a threaded end 512 and a head 514. Additionally, an example threaded knob 120A is shown having a shaft with a threaded end 516 and a head 518. The threaded knob 120B may be identical to the threaded knob 120A.

Figure 2:
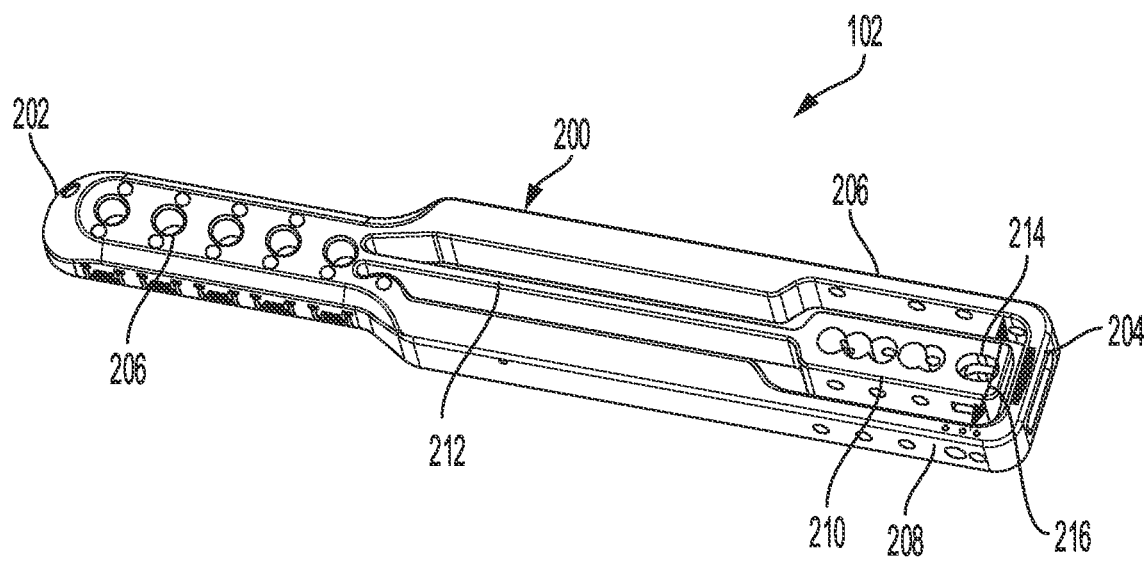
FIG. 2 illustrates a perspective view of a targeting body of the targeting device of FIGS. 1A and 1B, according to an aspect of the present disclosure.

FIG. 2 illustrates a perspective view of the targeting body 102 of the example targeting device 100. The targeting body 102 includes an outer frame 200 having a first end 202 opposite a second end 204, and a first side 206 opposite a second side 208. Adjacent the first end 202, the targeting body 102 includes multiple connection holes 206. It should be appreciated that only one connection hole 206 is indicated with a reference numeral in the figure solely for illustrative clarity in the figure and the description of the connection hole 206 applies equally to each of the illustrated connection holes 206. In at least some aspects, each connection hole 206 corresponds to a different length option of the nail 108 that may be used with the targeting device 100. For instance, a connection hole 206 closer to the first end 202 may correspond to a longer length option of the nail 108 than a connection hole farther from the first end 202.

The example targeting body 102 also includes a targeting block 210. In at least some aspects, the targeting block 210 is connected to the outer frame 200 by a flexible member 212. In one example, the flexible member 212 may be a leaf spring, though the flexible member 212 may be another suitably flexible component in other examples. The flexible member 212 enables the targeting block 210 to be translated towards either the first side 206 or the second side 208 of the outer frame 200 in an arc motion designated by the double-sided arrow 216. In at least some aspects, the targeting body 102 may include an adjustment assembly (e.g., the adjustment assembly 300 of FIGS. 3A and 3B) for adjusting and maintaining a position of the targeting block 210 relative to the first side 206 and the second side 208 of the outer frame 200. The targeting block 210 may include an opening 214 that can accommodate a portion of the adjustment assembly. The targeting block 210 may include multiple cannula holes that are described in more detail in connection with FIG. 4 below.

Figure 3A:
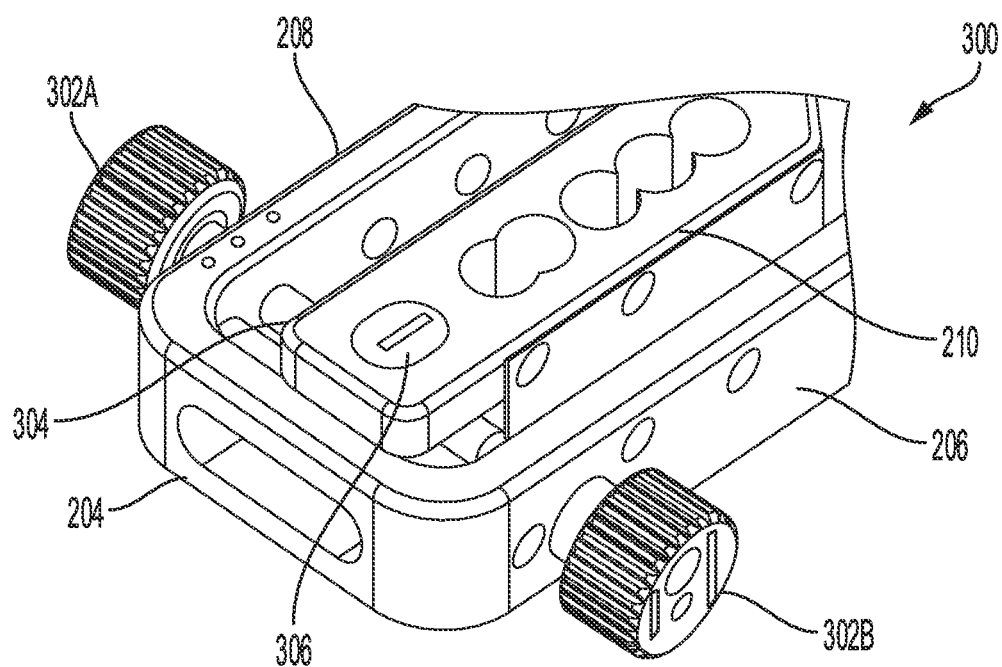
FIG. 3A illustrates a perspective view of an adjustment assembly of the targeting body of FIG. 2, according to an aspect of the present disclosure.
Figure 3B:
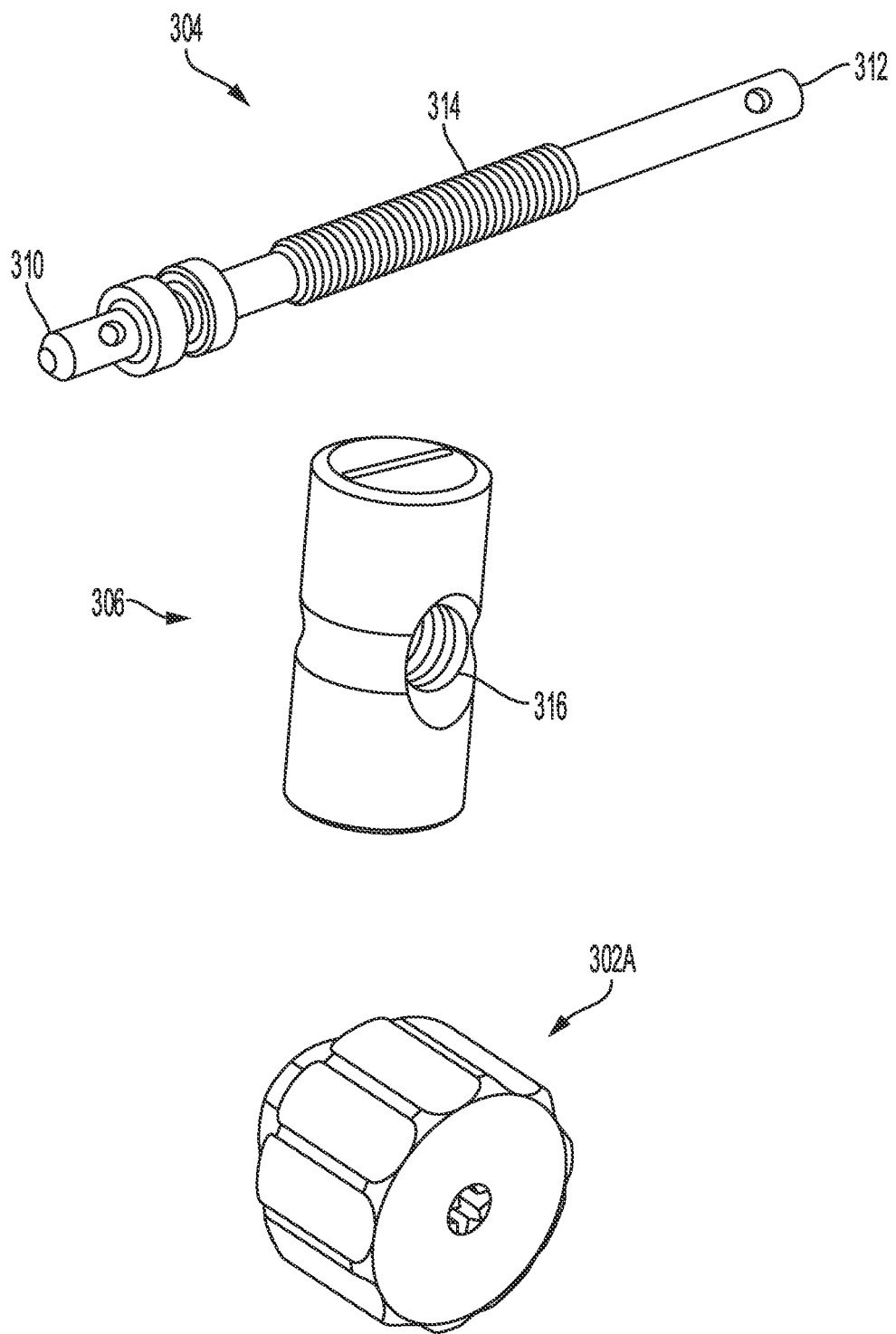
FIG. 3B illustrates perspective views of components of the adjustment assembly of FIG. 3A, according to an aspect of the present disclosure.

FIG. 3A illustrates an example adjustment assembly 300 of the targeting body 102 while FIG. 3B illustrates components of the example adjustment assembly 300 in more detail. In some aspects, the adjustment assembly 300 includes a connector 306 positioned within the opening 214 of the targeting block 210. The connector 306 may include an opening 316 having interior threading. A drive rod 304 may be positioned through the opening 316, through openings in the targeting block 210, and through openings in the sides 206 and 208 of the outer frame 200 that are all coaxial with the opening 316. The drive rod 304 includes a first end 310 opposite a second end 312 and a threaded portion 314.

The threaded portion 314 may engage with the interior threading of the opening 316. Turn knobs 302A and 302B may be permanently or removably attached to each of the first end 310 and the second end 312, respectively, of the drive rod 304. In some aspects, the targeting block 210 itself may include the interior threading that engages with the threaded portion 314 of the drive rod 304 rather than the separate connector 306.

As the turn knob 302A and/or the turn knob 302B is rotated in one direction, the engagement between the threaded portion 314 of the drive rod 304 and the interior threading of the opening 316 of the connector 306 drives the targeting block 210 either towards the first side 206 or the second side 208. The turn knob 302A and/or the turn knob 302B may be rotated in the opposite direction to drive the targeting block 210 towards the other of the first side 206 and the second side 208. Additionally, the engagement between the threaded portion 314 of the drive rod 304 and the interior threading of the opening 316 of the connector 306 maintains the position of the targeting block 210 in the absence of rotation of the turn knob 302A and/or the turn knob 302B.

Figure 4:
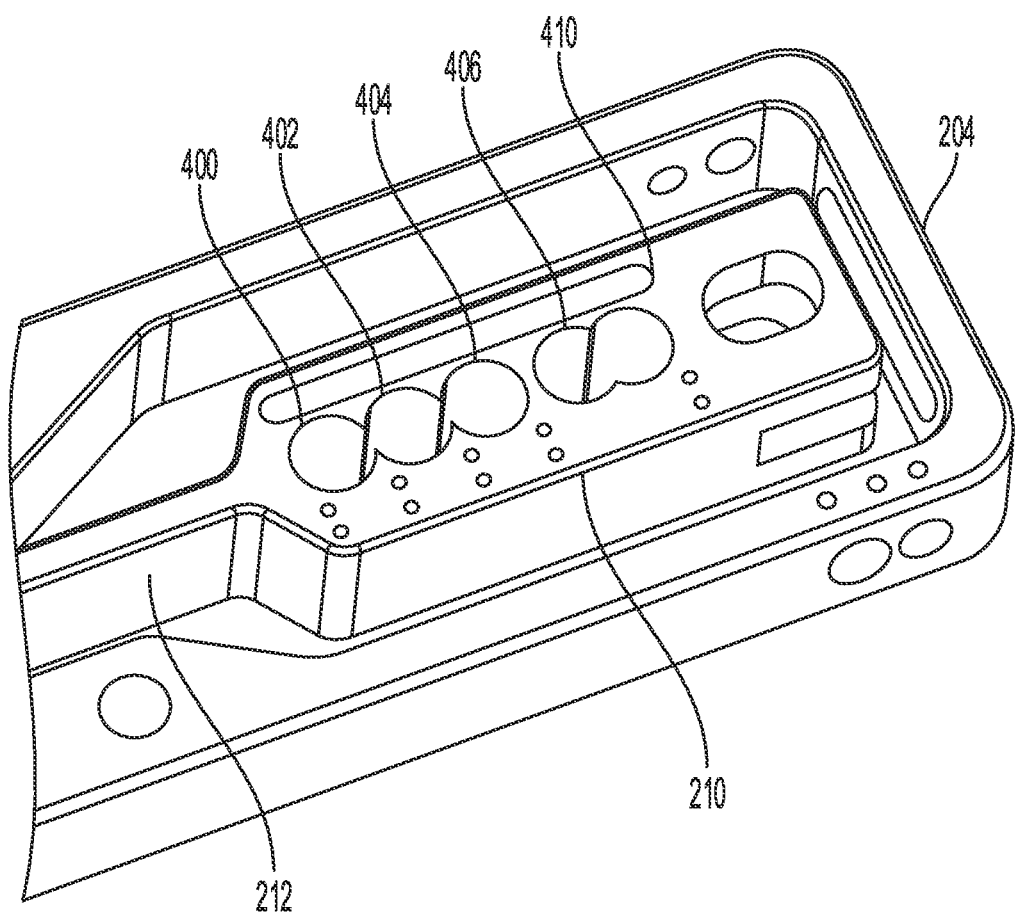
FIG. 4 illustrates a perspective view of the targeting block of the targeting body of FIG. 2, according to an aspect of the present disclosure.

FIG. 4 illustrates a perspective view of the targeting block 210 showing the cannula holes 400-406 of the targeting block 210. The cannula holes 400-406 may each be sized to enable a targeting cannula 112A or 112B to be positioned through a cannula hole 400-406. Additionally, each cannula hole 400-406 may be arranged on the targeting block 210 such that each cannula hole 400-406 corresponds to a particular screw hole 124A, 124B, 126A, or 126B of the nail 108 coupled to the targeting device 100. For instance, as described above, the screw holes 124A and 124B and the screw holes 126A and 126B can be offset from one another along a length of the nail 108. In an example, the cannula hole 400 may correspond to the screw hole 124A, the cannula hole 402 may correspond to the screw hole 126A, the cannula hole 404 may correspond to the screw hole 124B, and the cannula hole 406 may correspond to the screw hole 126B. Stated differently, in this example, the cannula holes 400 and 404 may each be used when targeting screws in the medial/lateral plane and the cannula holes 402 and 406 may each be used when targeting screws in the anterior/posterior plane.

A surgeon can potentially forget which cannula holes 400-406 are supposed to be used when installing bone screws in the medial/lateral plane versus when installing bone screws in the anterior/posterior plane. To help surgeons avoid confusion and increase reliability of correct targeting, in some aspects, the example targeting device 100 may include one or more removable inserts that, when used with the targeting block 210, allow access to only the cannula holes 400-406 needed for the plane in which bone screws are being installed. For example, the removable insert may allow access only to the cannula holes 400 and 404 (e.g., for the medial/lateral plane), or only to the cannula holes 402 and 406 (e.g., for the anterior/posterior plane). The removable inserts may have a variety of suitable shapes and sizes, examples of which are described herein. In some aspects, the targeting block 210 may include a slot 410. The slot 410 may have various suitable purposes as described herein. For example, the slot 410 may be utilized to help maintain a removable insert in contact with the targeting block 210, help maintain a targeting cannula 112A, 112B within a cannula hole 400-406, or other suitable purposes.

Figure 6:
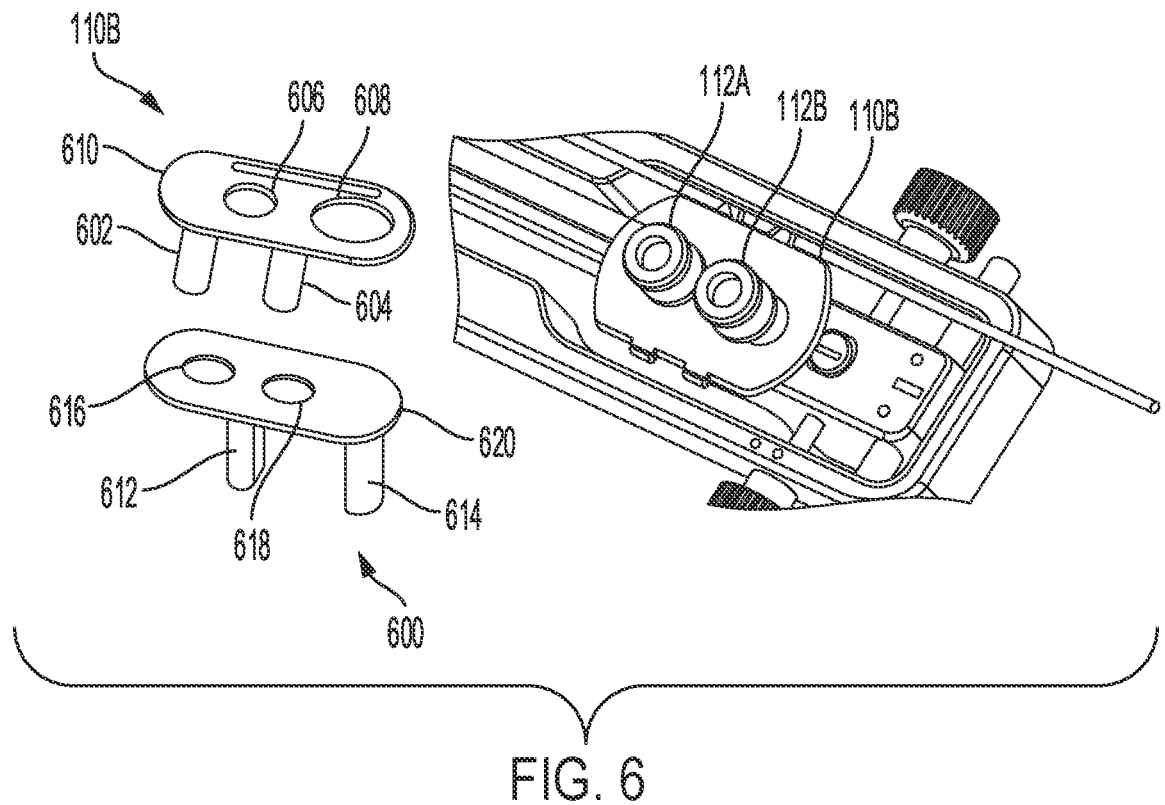
FIG. 6 illustrates perspective views of example removable inserts, according to an aspect of the present disclosure.

FIG. 6 illustrates the example insert 110B and an example insert 600. The example insert 600 may be an alternative version of the insert 110A shown in FIG. 1A. The insert 110B is constructed for targeting screws in the anterior/posterior plane. For instance, the insert 110B includes a body 610 having an opening 606 and an opening 608. A leg 602 and a leg 604 each extend from the body 610. When the insert 110B is used with the targeting block 210, as shown in FIG. 6, the leg 602 is positioned within the cannula hole 400 and the leg 604 is positioned within the cannula hole 404, thereby blocking entry of a targeting cannula 112A, 112B into the cannula holes 400 and 404. Conversely, the opening 606 and the opening 608 respectively allow entry of a targeting cannula 112A, 112B into the cannula holes 402 and 406.

The insert 600 is constructed for targeting screws in the medial/lateral plane. For instance, the insert 600 includes a body 620 having an opening 616 and an opening 618. A leg 612 and a leg 614 each extend from the body 620. When the insert 600 is used with the targeting block 210, the leg 612 is positioned within the cannula hole 402 and the leg 614 is positioned within the cannula hole 406, thereby blocking entry of a targeting cannula 112A, 112B into the cannula holes 402 and 406. Conversely, the opening 616 and the opening 618 respectively allow entry of a targeting cannula 112A, 112B into the cannula holes 400 and 404. Accordingly, a surgeon can use the insert 110B when targeting bone screws in the anterior/posterior plane and the insert 600 when targeting bone screws in the medial/lateral plane to ensure that the targeting cannulas 112A, 112B are inserted into the proper cannula holes 400-406.

One potential complication during surgery is if a targeting cannula 112A, 112B slips out of the targeting block 210 and drops to the floor. In some aspects, to help avoid this potential complication, the targeting device 100 may include one or more magnets arranged to help maintain a targeting cannula 112A, 112B within a respective cannula hole 400-406. For example, one or more magnets may be positioned in the targeting block 210 and/or in the removable inserts. The magnetic force of the one or more magnets pulls a targeting cannula 112A, 112B positioned inside a respective cannula hole 400-406 towards the one or more magnets, thereby increasing the friction between the targeting cannula 112A, 112B and the respective cannula hole 400-406 to help maintain the targeting cannula 112A, 112B within the respective cannula hole 400-406.

Figure 7A:
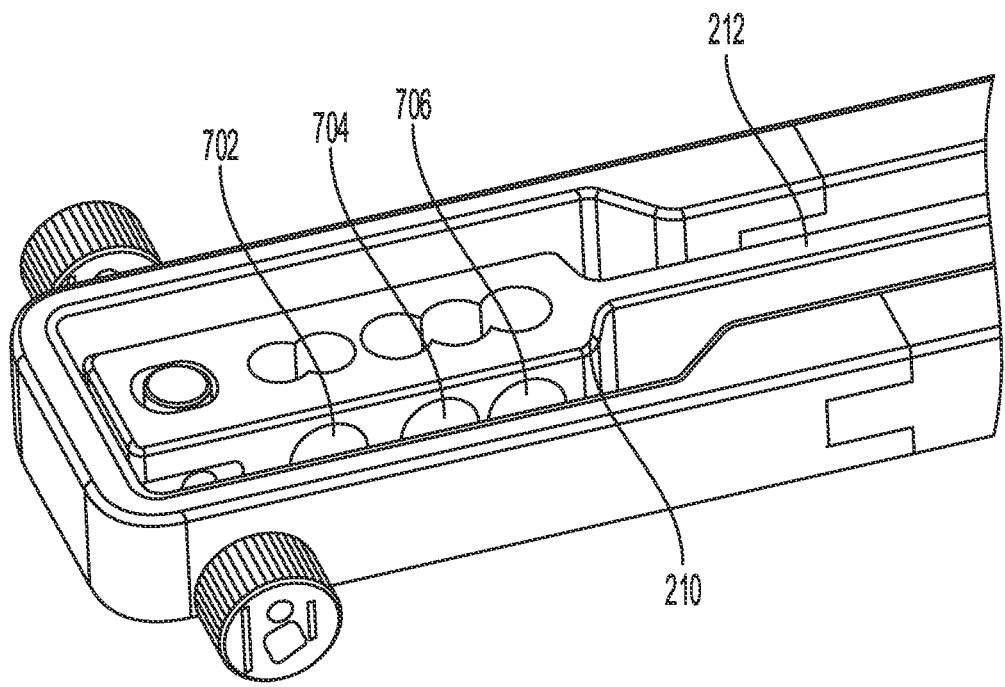
FIGS. 7A to 7D illustrate perspective views of example magnet arrangements for helping maintain targeting cannulas within cannula holes of the targeting block of FIGS. 1A and 1B, according to an aspect of the present disclosure.
Figure 7B:
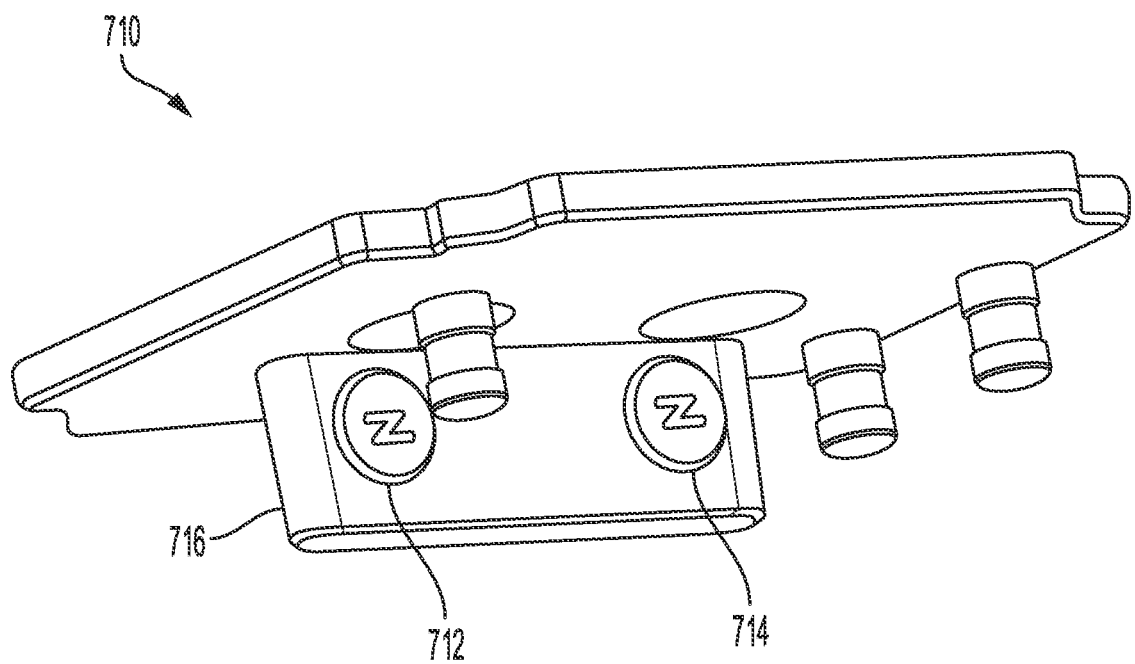
Figure 7C:
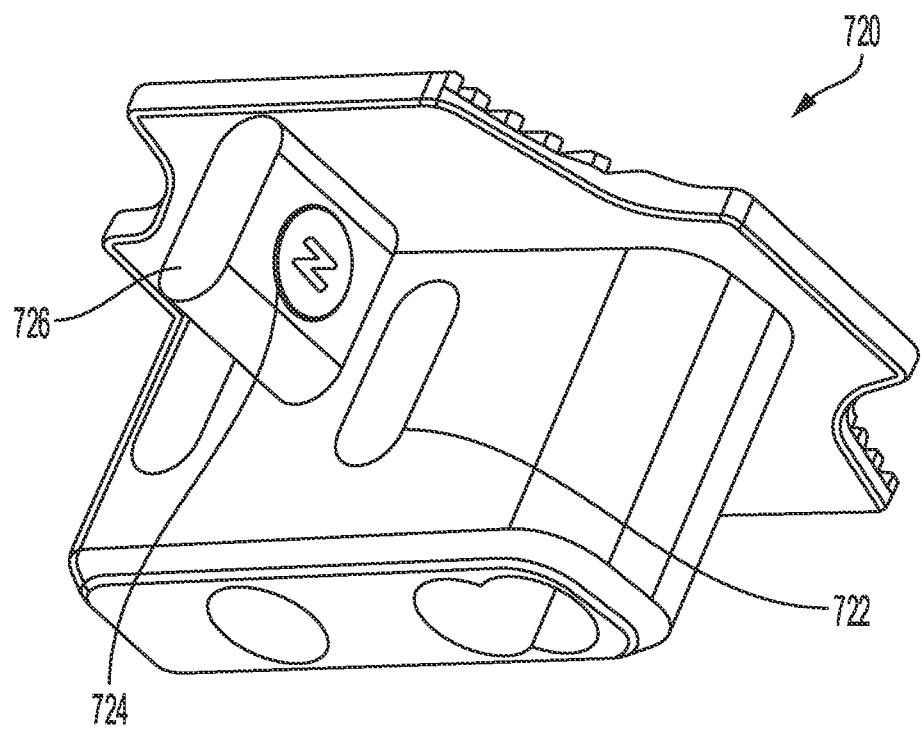
Figure 7D:
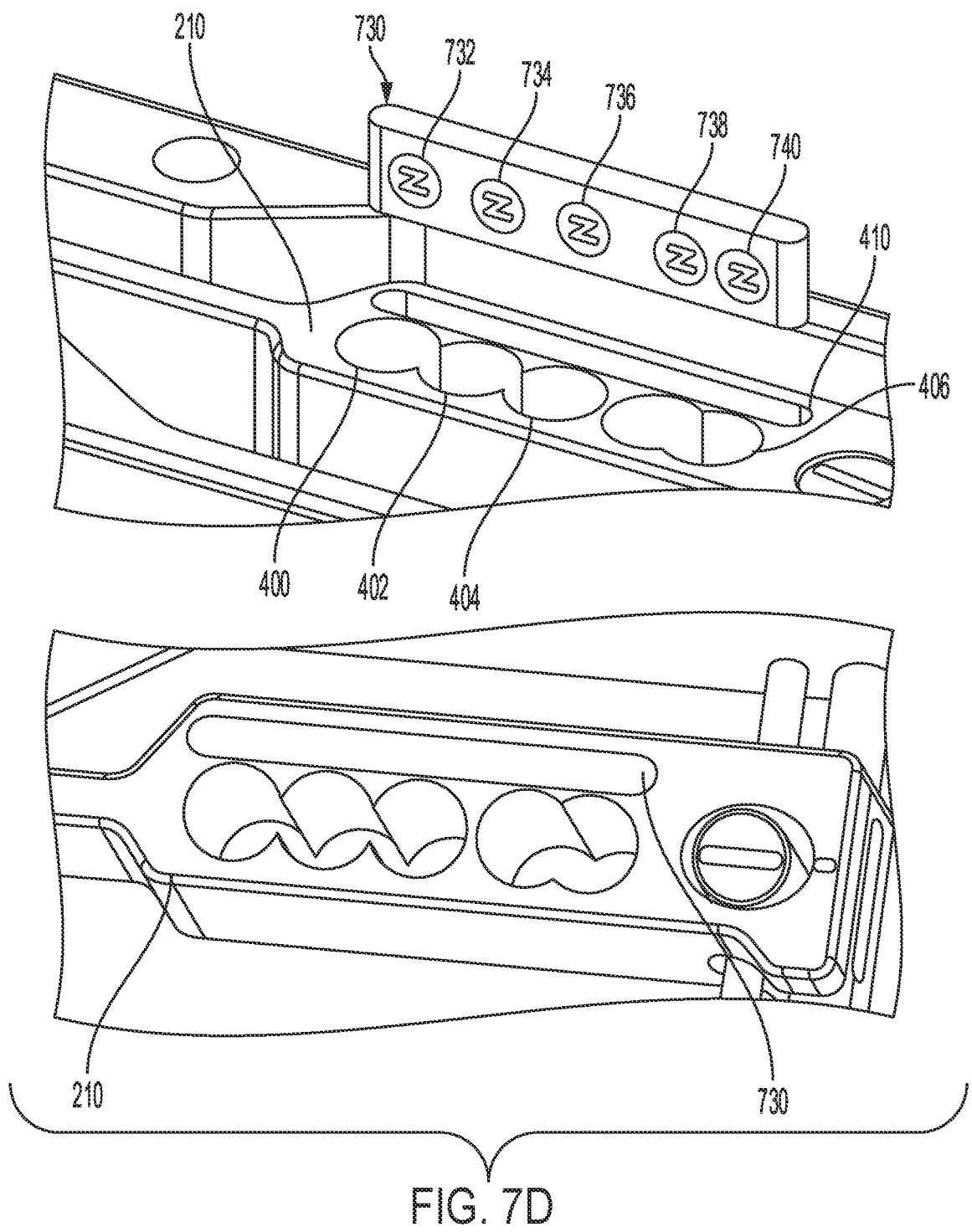

FIGS. 7A to 7D illustrate example arrangements of the one or more magnets. In the example of FIG. 7A, the magnets 702, 704, and 706 are embedded directly in the targeting block 210. In another example, magnets may be embedded in or otherwise incorporated into a removable insert of the present disclosure. FIG. 7B illustrates an example removable insert 710 having magnets 712 and 714 embedded in a leg 716 of the removable insert 710. The leg 716 may be inserted within the slot 410 of the targeting block 210. FIG. 7C illustrates an example removable insert 720 having one or more pockets 722 (e.g., the example removable insert 720 is shown with two pockets 722). A magnet 724, or a component 726 including the magnet 724, may be inserted within the pocket 722. In the example of FIG. 7D, a cassette 730 including multiple magnets 732-740 may be inserted into the slot 410 of the targeting block 210. The multiple magnets 732-740 may be arranged on the cassette 730 such that when the cassette 730 is inserted into the slot 410 each magnet 732-740 is lined up with a respective cannula hole 400-406.

In at least some aspects, the provided targeting device 100 can include features that aid surgeons in correctly aligning the targeting device 100 when targeting a drill bit to drill through a nail hole. Surgeons typically apply the circle-circle technique when aligning a typical targeting instrument in which the typical targeting instrument has radiopaque markers that are aligned to be concentric and on top of the radiographically visible nail holes. This circle-circle technique requires alignment of the typical targeting instrument that is attached to the nail sitting inside the intramedullary canal to the fluoroscopy machine. The surgeon has to move the C-arm (e.g., fluoroscopy machine) in 3D-space using all six axes to get it properly aligned. This can be difficult and may take time (e.g., a few minutes) to do, especially for more inexperienced surgeons. Furthermore, once the correct position is found, the C-arm typically needs to be held in place by hand while the surgeon drills free-hand into the bone and hopefully through the nail hole.

Figure 8:
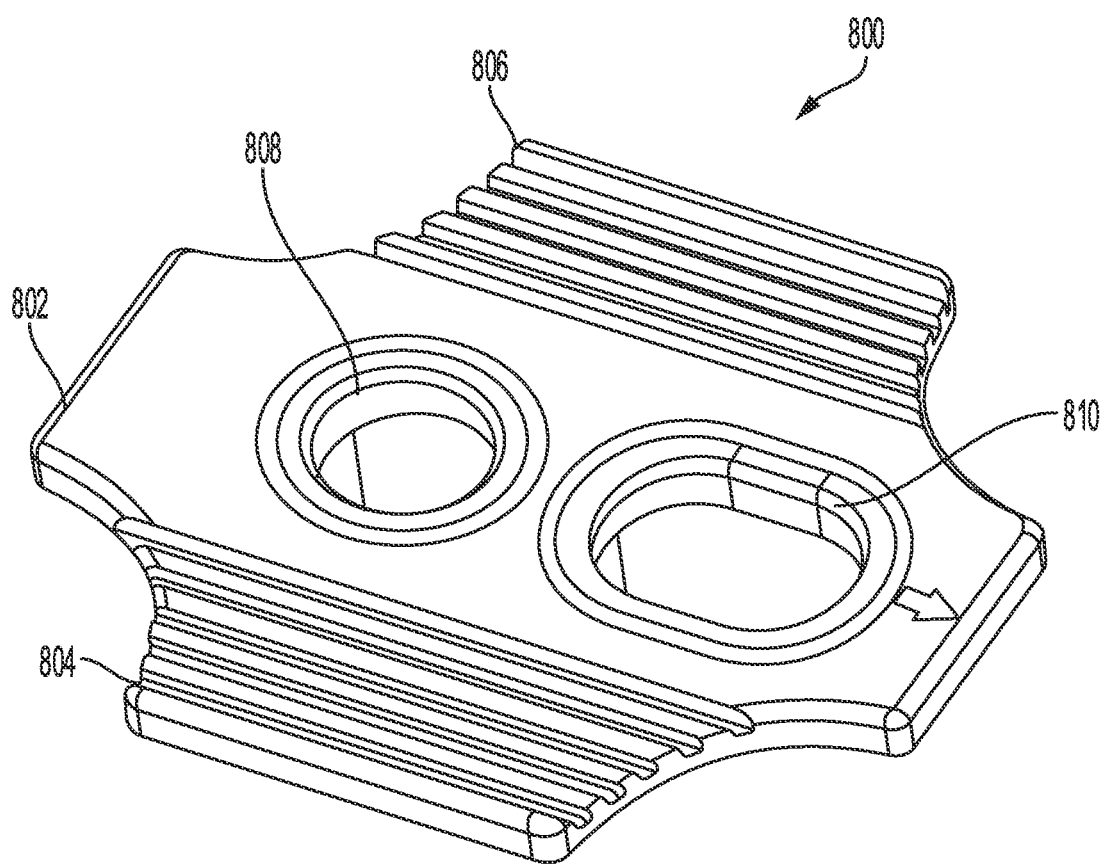
FIG. 8 illustrates a perspective view of an example removable insert that includes a body having multiple slots, according to an aspect of the present disclosure.
Figure 9:
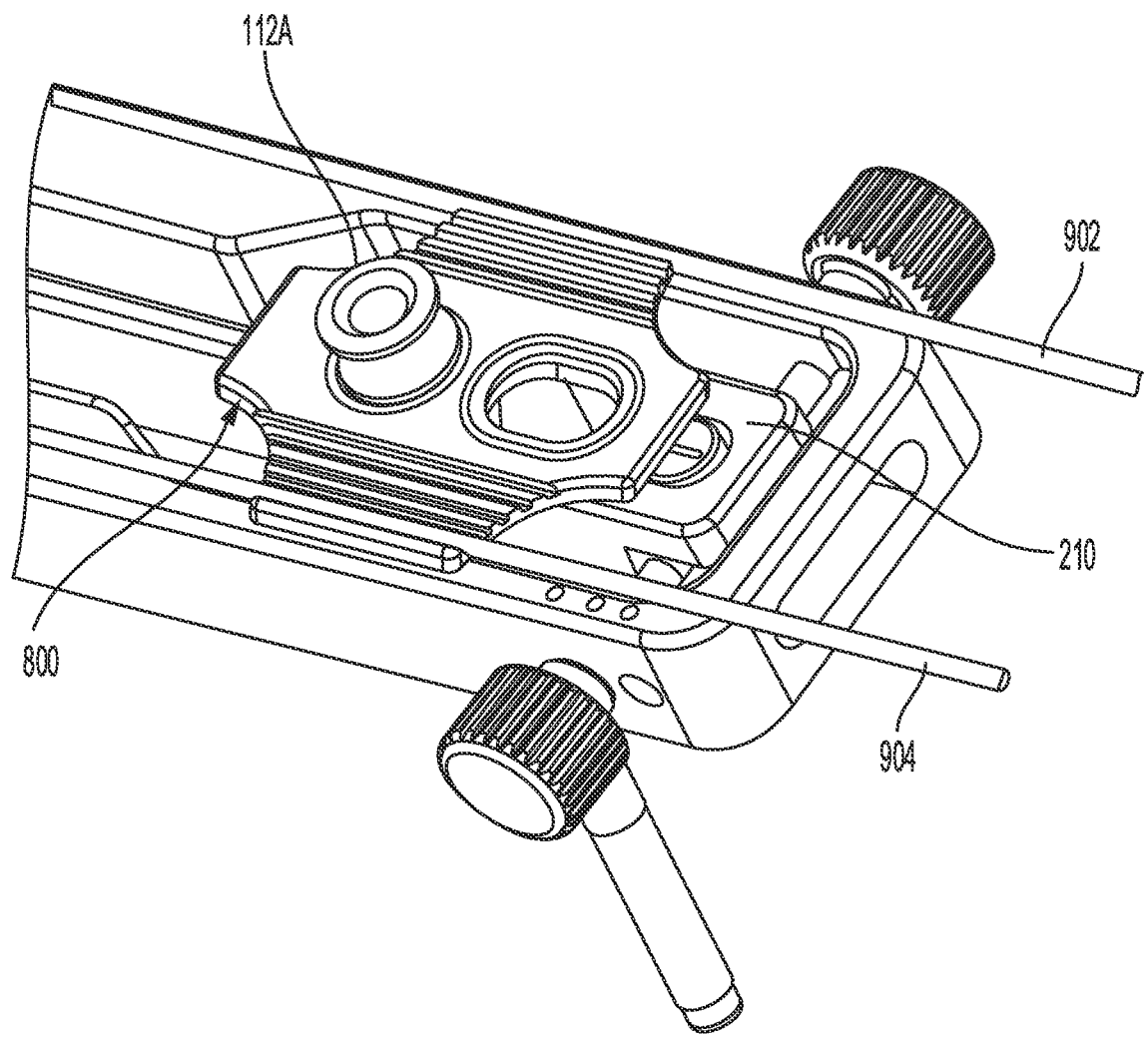
FIG. 9 illustrates a perspective view of k-wires snapped into respective slots of the removable insert of FIG. 8 while the removable insert is used with the targeting block of FIG. 2, according to an aspect of the present disclosure.

To aid a surgeon in aligning the example targeting device 100, in some aspects, the targeting device 100 may include a component(s) that enables a surgeon to align an installed nail with one or more straight lines on a fluoroscopy image such that the nail is equidistant with the one or more straight lines. In one aspect, this component for creating the one or more straight lines may be a radiopaque guidewire (e.g., k-wire) that is visible on a fluoroscopy image. The k-wire may be integral with or attached to the example targeting device 100. For example, FIG. 8 illustrates an example removable insert 800 that includes a body 802 having multiple slots 804, 806. In this example, the removable insert 800 is shown including five slots 804, 806 on each side of the openings 808 and 810, though may include other suitable quantities of slots 804, 806 in other examples. A k-wire may be inserted within (e.g., snapped into) any of the slots 804, 806 of the removable insert 800. For instance, a surgeon may choose which slot 804, 806 to insert a k-wire that will enable the surgeon to best assess the equidistant alignment between the k-wire and an installed nail on a fluoroscopy image. FIG. 9 illustrates a k-wire 900 snapped into the slot 804 and a k-wire 902 snapped into the slot 806 of the removable insert 800 while the removable insert 800 is used with the targeting block 210. In other examples, the targeting body 102 or the targeting block 210 may include one or more slots so that a k-wire, or other suitable straight-line component, can be coupled directly with the targeting body 102 or the targeting block 210 rather than a removable insert.

Figure 10:
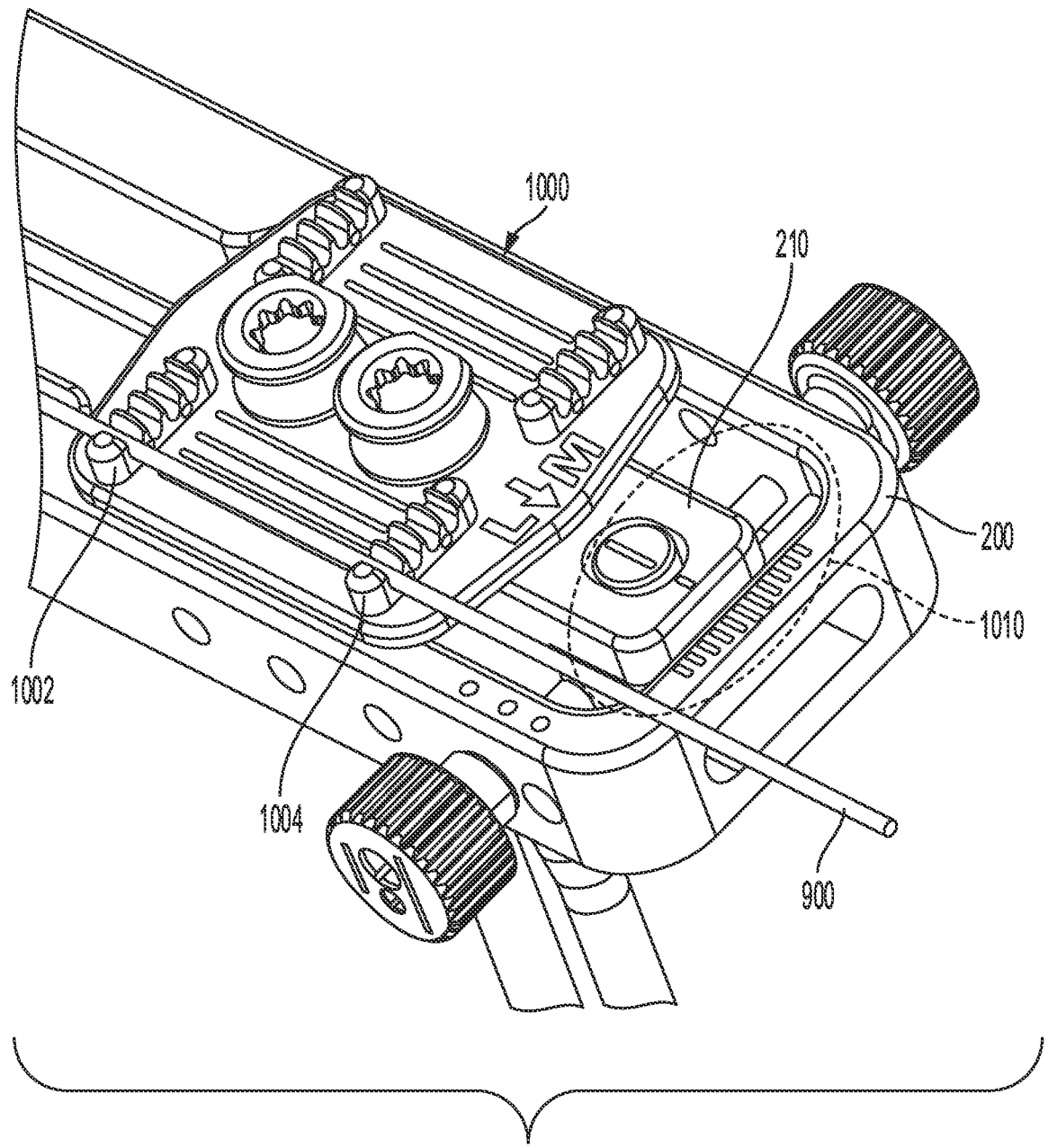
FIG. 10 illustrates a perspective view of a k-wire snapped into slots of an example removable insert and example markings that aid in aligning the k-wire on a fluoroscopy image, according to an aspect of the present disclosure.

FIG. 10 illustrates the k-wire 900 snapped into slots 1002 and 1004 of an example removable insert 1000. The slot 1002 and 1004 do not extend the length of the example removable insert 1000 as compared to the slots 804 and 806 of the removable insert 800. FIG. 10 also illustrates a set of markings 1010 on the outer frame 200 and the targeting block 210 of the targeting body 102. For instance, the set of markings 1010 may include a single marking on the targeting block 210 and multiple markings on the outer frame 200. The alignment of the single marking on the targeting block 210 relative to the multiple markings on the outer frame 200 may aid a surgeon when adjusting the targeting block 210 (e.g., via the adjustment assembly 300) so that the k-wire 900, on a fluoroscopy image, is equidistant along its length with an installed nail. The process of aligning a k-wire with an installed nail on a fluoroscopy image is described in more detail in connection with FIG. 15 below.

Figure 11:
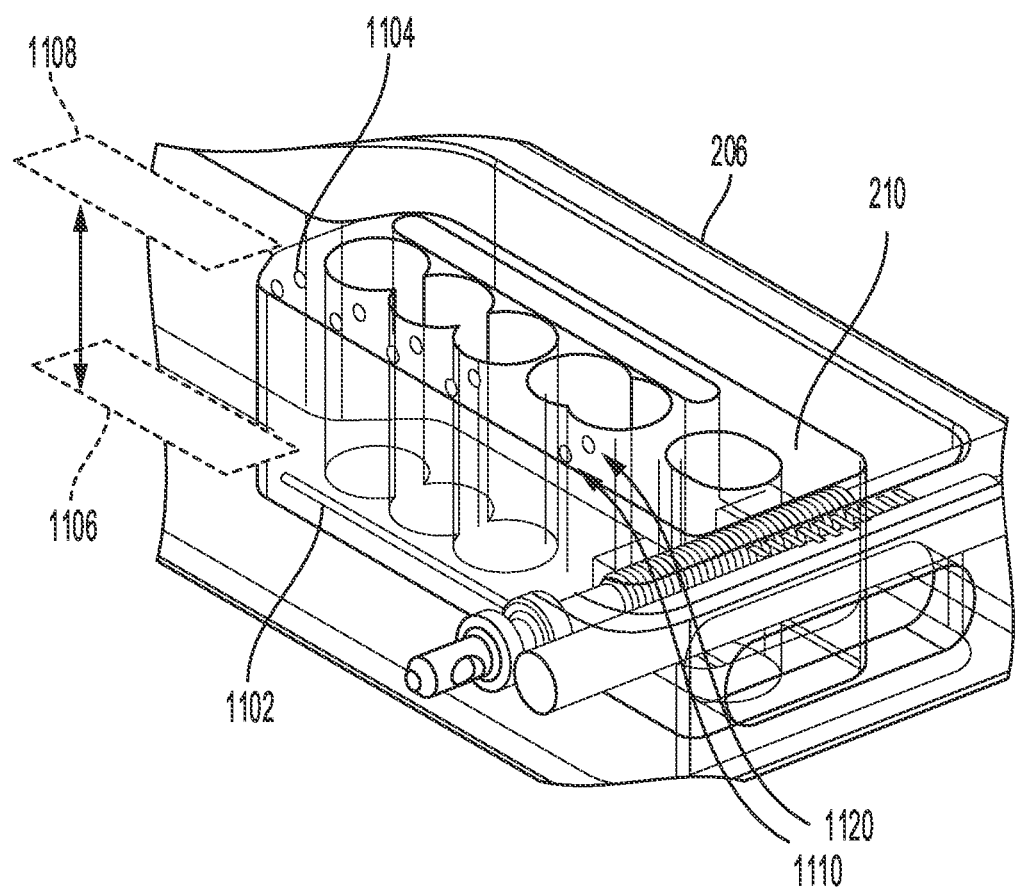
FIG. 11 illustrates a perspective view of a transparent targeting body of FIG. 2 showing radiopaque spheres and a radiopaque rod embedded within a targeting block, according to an aspect of the present disclosure.

In other aspects, to aid a surgeon in aligning the example targeting device 100, the targeting device 100 may include radiopaque marker(s) embedded within the targeting device 100. For example, as shown in FIG. 11, multiple radiopaque spheres 1104 and a radiopaque rod 1102 may be embedded within the targeting block 210. In other examples, the radiopaque markers may have suitable shapes other than spheres and a rod. The multiple radiopaque spheres 1104 are at a different height (e.g., on a different plane) than the radiopaque rod 1102 within the targeting block 210. For instance, FIG. 11 shows a plane 1106 of the radiopaque rod 1102 and a plane 1108 of the radiopaque spheres 1104. The multiple radiopaque spheres 1104 may be arranged into two separate columns 1110 and 1120. The radiopaque rod 1102 is parallel with an imaginary straight line extending through each of the radiopaque spheres 1104 in the column 1110 and with an imaginary straight line extending through each of the radiopaque spheres 1104 in the column 1120. From a top view (e.g., looking down an axis perpendicular with a top surface of the targeting block 210), the radiopaque rod 1102 is between the column 1110 and the column 1120 and is equidistant from the imaginary straight line extending through each of the radiopaque spheres 1104 in the column 1110 and the imaginary straight line extending through each of the radiopaque spheres 1104 in the column 1120 (e.g., see FIG. 16B). The arrangement of the radiopaque spheres 1104 and the radiopaque rod 1102 help a surgeon align a C-arm (e.g., fluoroscopy machine) to be perpendicular to the targeting device 100, which is described in more detail in connection with FIGS. 16A and 16B below.

One difficulty surgeons face when aligning a drill bit to target screws with a C-arm is the parallax effects inherent to a C-arm that can create a distorted fluoroscopy image. Due to the design of the C-arm, a distance of imaged objects relative to the x-ray source and the collimator affects how those objects appear on the fluoroscopy image. Additionally, the further away an object (e.g., a radiopaque marker) is from a target object (e.g., bone), the greater the distortion will be on a fluoroscopy image due to the parallax effects. Because the targeting body 102 of the targeting device 100 is exterior to a patient during imaging while the nail 108 is installed within the patient's humerus, the magnification of the targeting body 102 relative to the nail 108 may appear distorted on the fluoroscopy image. For instance, it may appear that certain indicators (e.g., the k-wire 902 and the nail 108, or the radiopaque rod 1102 and the radiopaque spheres 1104) on the fluoroscopy image are misaligned when the physical objects corresponding to those indicators are, in fact, aligned.

Figure 12:
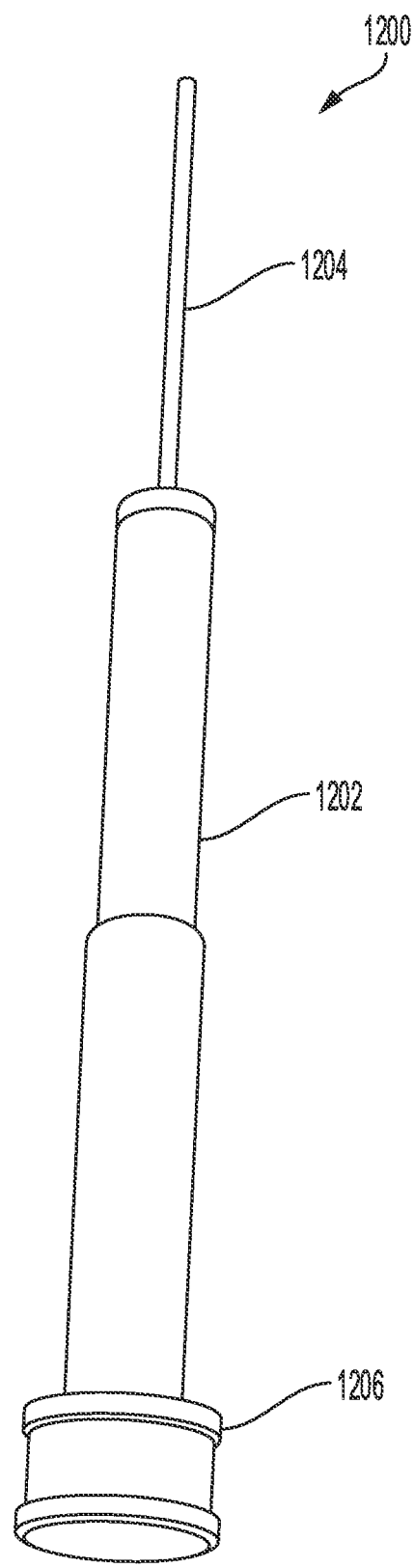
FIG. 12 illustrates a perspective view of a targeting marker, according to an aspect of the present disclosure.

In some aspects, to help combat the parallax effects and aid a surgeon in aligning the example targeting device 100, the targeting device 100 may include one or more removable targeting markers 1200 shown in FIG. 12. A targeting marker 1200 may include a radiolucent body 1202 and a radiopaque core 1204 that extends exteriorly to the radiolucent body 1202. The radiopaque core 1204 may extend an entire length of the interior of the radiolucent body 1202 or only a portion thereof. The radiopaque core 1204 may extend exteriorly from the radiolucent body 1202 any suitable amount. A targeting marker 1200 may be positioned through a cannula hole 400-406 of the targeting device 100 during alignment. When the targeting marker 1200 is so positioned, a tip of the radiopaque core 1204 is near or touching the patient's humerus. As such, a distance between the tip of the radiopaque core 1204 and the humerus is minimized thereby minimizing the parallax effects on the fluoroscopy image relative to the tip of the radiopaque core 1204 and the humerus. In this way, a targeting marker 1200 can make it easier for a surgeon to assess an accurate alignment of the targeting device 100 to the screw holes 124A, 124B, 126A, 126B of the nail 108.

In some aspects, the tip of the radiopaque core 1204 may be dull. In other aspects, the tip of the radiopaque core 1204 may be sharp to allow a surgeon to make an indent into the bone. Making an indent into the bone after final adjustment can aid the subsequent drilling while preventing skiving off the bone. In some aspects, a targeting marker 1200 may include a radiopaque ring 1206 at a trailing end of the radiolucent body 1202. The radiopaque ring 1206 can aid in identifying the different ends of the targeting marker 1200 on a fluoroscopy image, which can help a surgeon identify which end on the fluoroscopy image is the tip of the radiopaque core 1204 that is near or touching the humerus. The use of a targeting marker 1200 during the alignment procedure is discussed further in connection with FIGS. 18 and 19 below.

Figure 13:
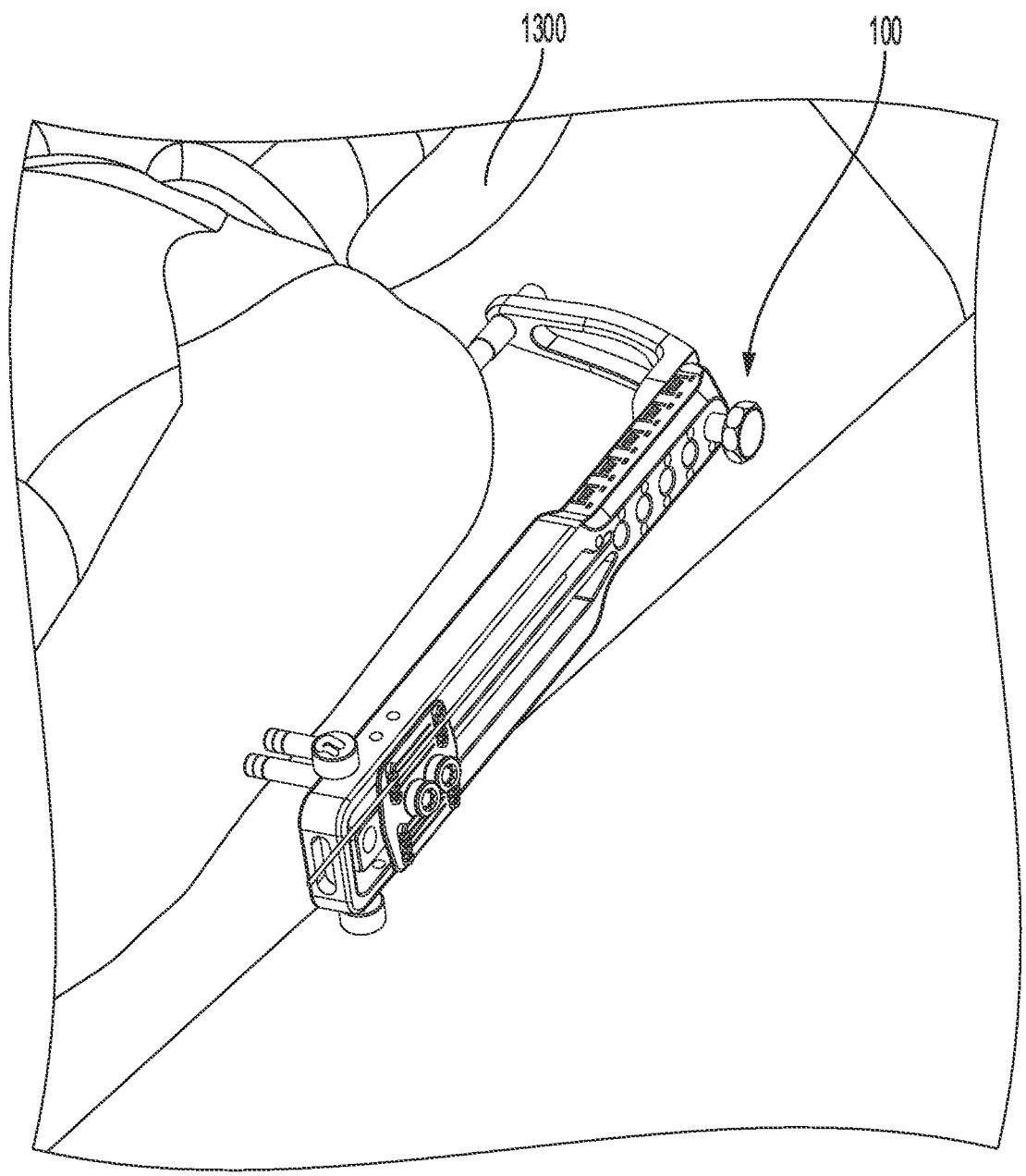
FIG. 13 illustrates a perspective view of the targeting device of FIG. 1A positioned relative to a patient for targeting screws, according to an aspect of the present disclosure.
Figure 14:
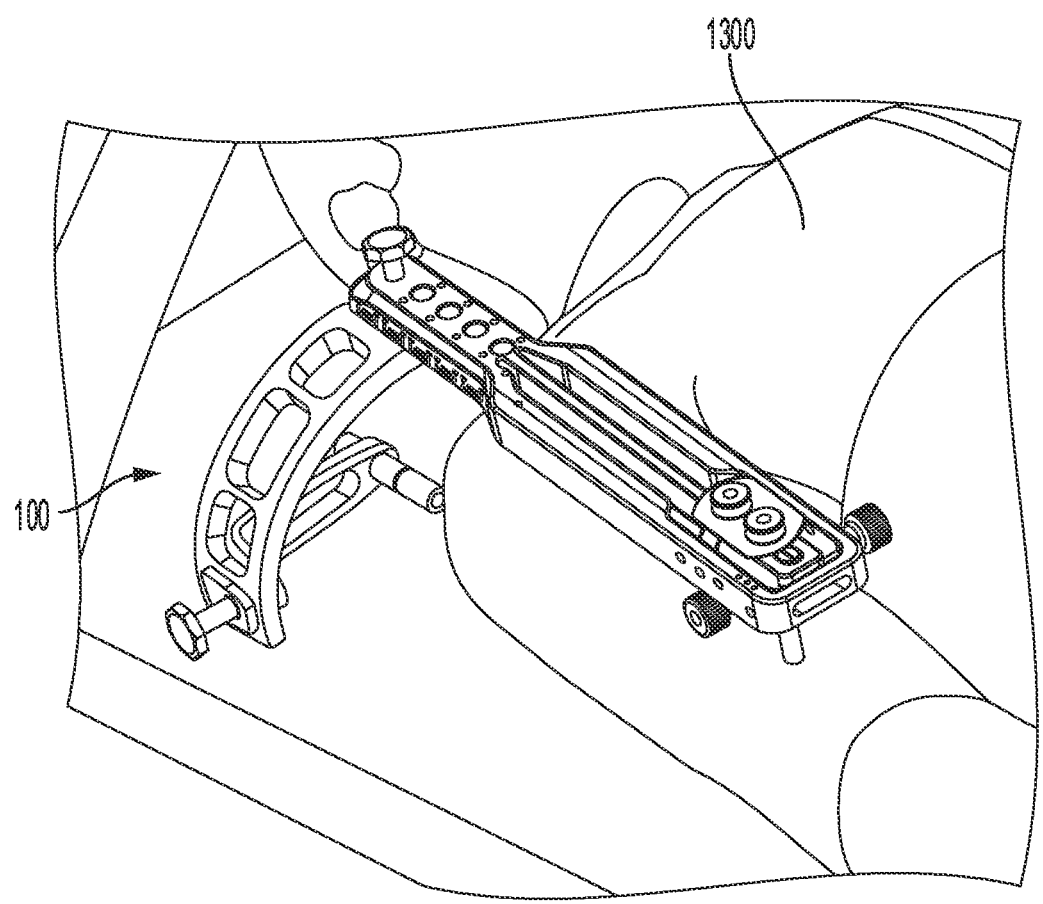
FIG. 14 illustrates a perspective view of the targeting device of FIG. 1B positioned relative to a patient for targeting screws, according to an aspect of the present disclosure.

A method for targeting screws using the example targeting device 100 will now be described. A surgeon may first install a nail (e.g., the nail 108) in a humerus of a patient, which may include drilling a hole in the humerus to prepare for insertion of the nail 108. The targeting device 100 may be coupled to the installed nail 108, for example, via the lag bolt 122. As mentioned, screws are typically targeted in both the medial/lateral plane and the anterior/posterior plane. FIG. 13 illustrates a perspective view of the targeting device 100 configured and positioned relative to a patient 1300 for targeting screws in the medial/lateral plane. FIG. 14 illustrates a perspective view of the targeting device 100 configured and positioned relative to the patient 1300 for targeting screws in the anterior/posterior plane. The targeting device 100 in either position of FIG. 13 or 14 is coupled to the installed nail 108 (not shown) within a humerus of the patient 1300. In this example, the surgeon first targets screws in the medial/lateral plane, though in other examples the surgeon may first target screws in the anterior/posterior plane.

In some aspects, the surgeon may then select and insert a removable insert corresponding to the plane in which the surgeon is targeting screws. Whether or not a removable insert is used, the surgeon may then align the targeting device 100 using fluoroscopy so that the cannula holes 400 and 404 are aligned with the screw holes 124A and 124B of the installed nail 108.

Figure 15A:
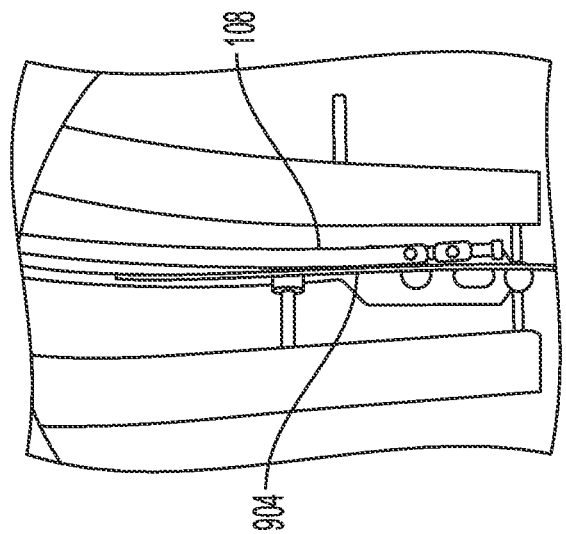
FIGS. 15A and 15B illustrate portions of a method for aligning a k-wire of FIG. 9 with an installed nail on a fluoroscopy image, according to an aspect of the present disclosure.
Figure 15B:
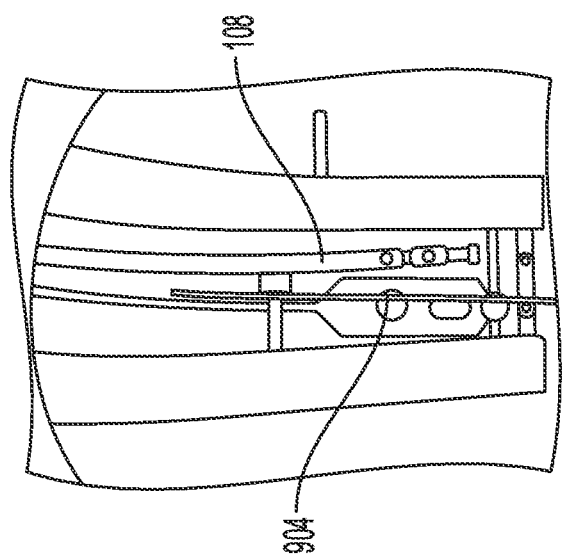

In some aspects, aligning the targeting device 100 includes aligning, on a fluoroscopy image, a k-wire (e.g., the k-wire 904) with the installed nail 108 such that the k-wire 108 along its length is equidistant from the nail 108. FIG. 15A illustrates a representation of the k-wire 904 being misaligned with the nail 108. As such, the surgeon may adjust the position of the targeting device 100. For example, the surgeon may rotate the turn knob 302A and/or the turn knob 302B of the adjustment assembly 300 to adjust the positioning of the targeting block 210, which is coupled to the k-wire 904. FIG. 15B illustrates a representation of the k-wire 904 being in proper alignment with the nail 108 after adjustment. In such aspects, once the k-wire 904 is properly aligned with the nail 108, the targeting block 210 is aligned to the screw holes 124A and 124B of the nail 108. Using this technique of aligning a straight k-wire 904 with the straight edge of the nail 108 eliminates the requirement of precisely aligning the C-arm (e.g., fluoroscopy machine) to the targeting device 100 thereby eliminating two axes of freedom.

Figure 16A:
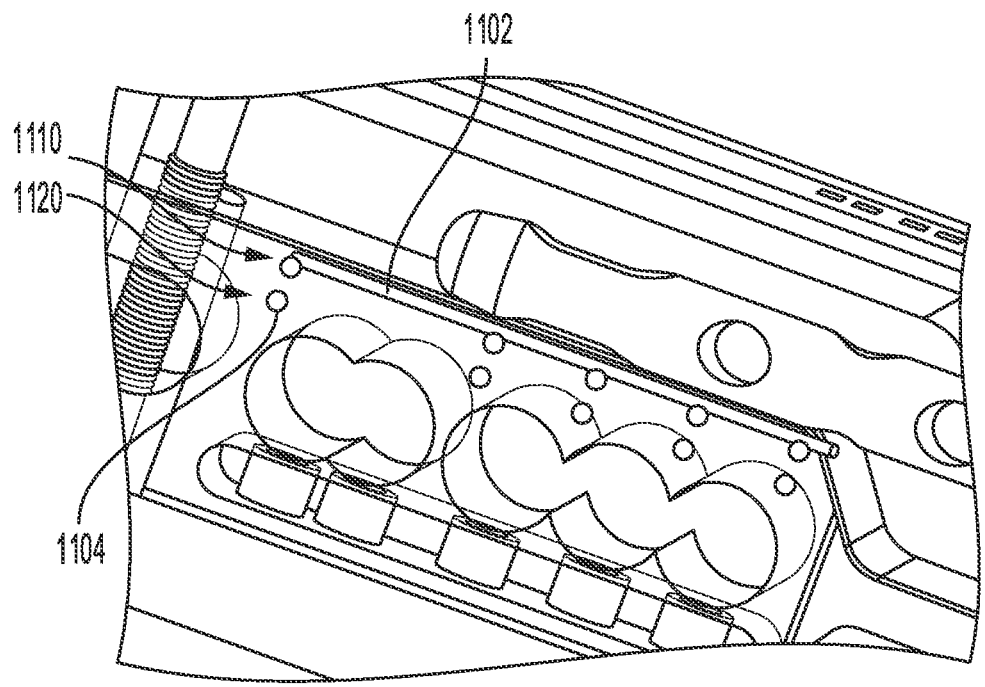
FIGS. 16A and 16B illustrate portions of a method for aligning the radiopaque rod of FIG. 11 with the radiopaque spheres of FIG. 11, according to an aspect of the present disclosure.
Figure 16B:
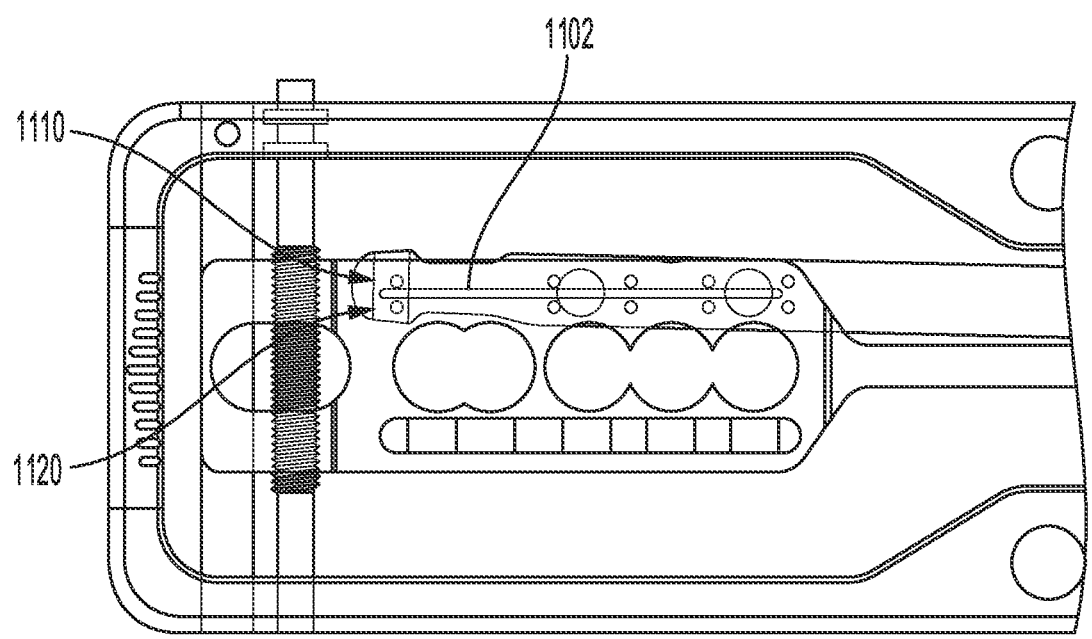

In other aspects, aligning the targeting device 100 includes adjusting the targeting device 100 such that, on a fluoroscopy image, radiopaque markers (e.g., the radiopaque rod 1102 and radiopaque spheres 1104) are aligned. The radiopaque markers may be embedded within the targeting device 100 as described above. FIG. 16A illustrates a representation of the radiopaque rod 1102 being misaligned with the radiopaque spheres 1104. As such, the surgeon may move and rotate the C-arm, or the arm of the patient 1300 with the targeting device 100, until the radiopaque rod 1102 is positioned equidistantly between the two columns 1110 and 1120 of spheres 1104. FIG. 16B illustrates a representation of the radiopaque rod 1102 being properly aligned with the two columns 1110 and 1120 of spheres 1104. At this point, the C-arm is now aligned perpendicular to the targeting device 100.

Figure 17A:
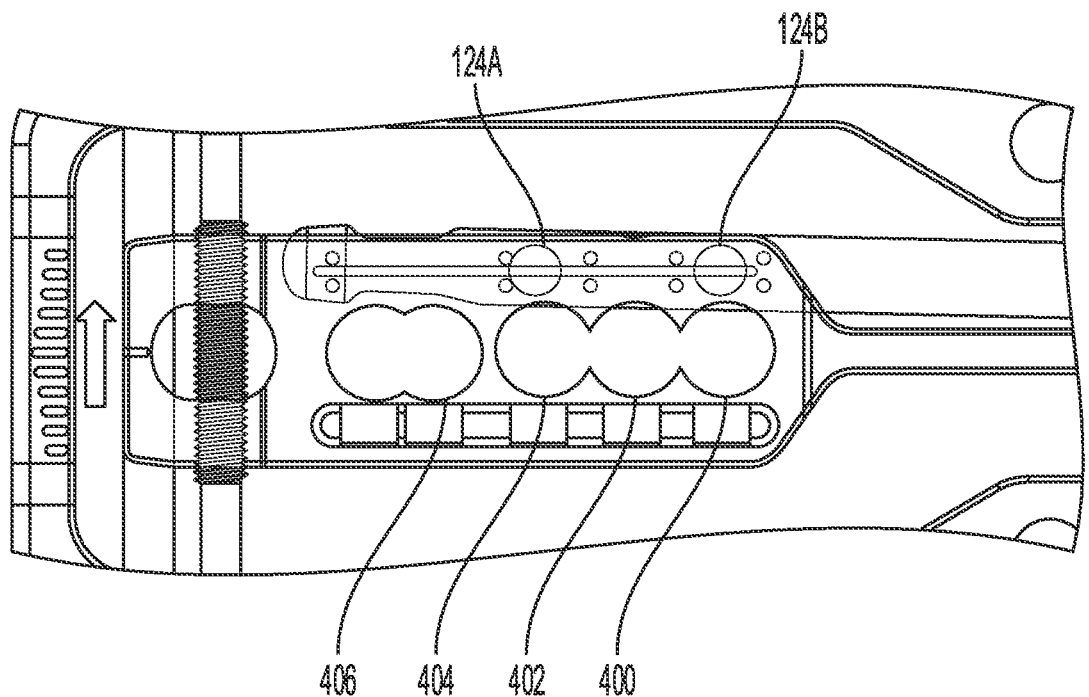
FIGS. 17A and 17B illustrate portions of a method for aligning the cannula holes of FIG. 4 with the screw holes on the nail of FIG. 1B, according to an aspect of the present disclosure.
Figure 17B:
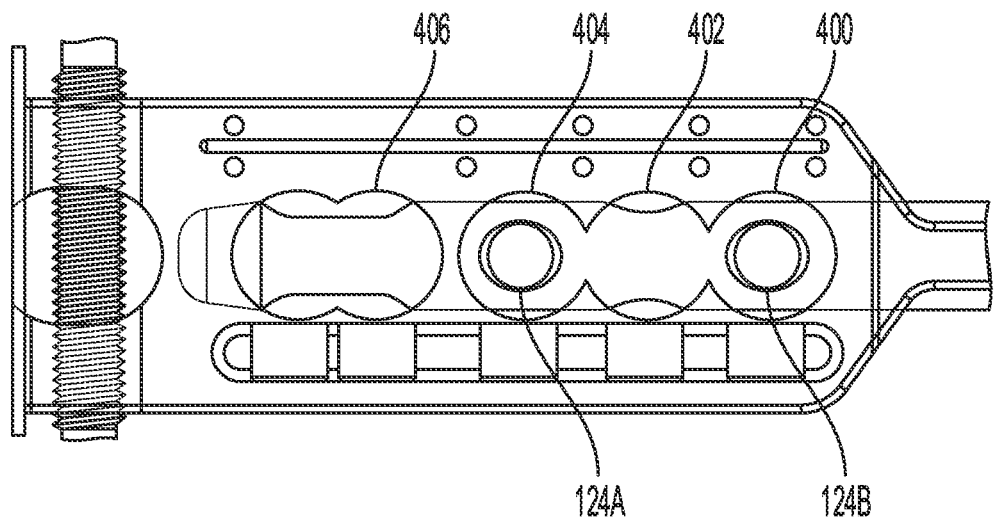

In at least some instances, the cannula holes 400 and 404 may not be aligned with the screw holes 124A and 124B, as shown in the representation illustrated in FIG. 17A. In such instances, the surgeon may adjust the targeting block 210 so that the cannula holes 400 and 404 are aligned with the screw holes 124A and 124B. For example, the surgeon may rotate the turn knob 302A and/or the turn knob 302B of the adjustment assembly 300 to adjust the positioning of the targeting block 210 so that the cannula holes 400 and 404 are concentric with the screw holes 124A and 124B. This is similar to the circle-circle technique mentioned above. FIG. 17B illustrates a representation of the cannula holes 400 and 404 being properly aligned with the screw holes 124A and 124B. In aspects in which radiopaque markers are used for alignment, once the radiopaque rod 1102 and radiopaque spheres 1104 are properly aligned and the cannula holes 400 and 404 are properly aligned, the targeting block 210 is aligned to the screw holes 124A and 124B of the nail 108.

Figure 18:
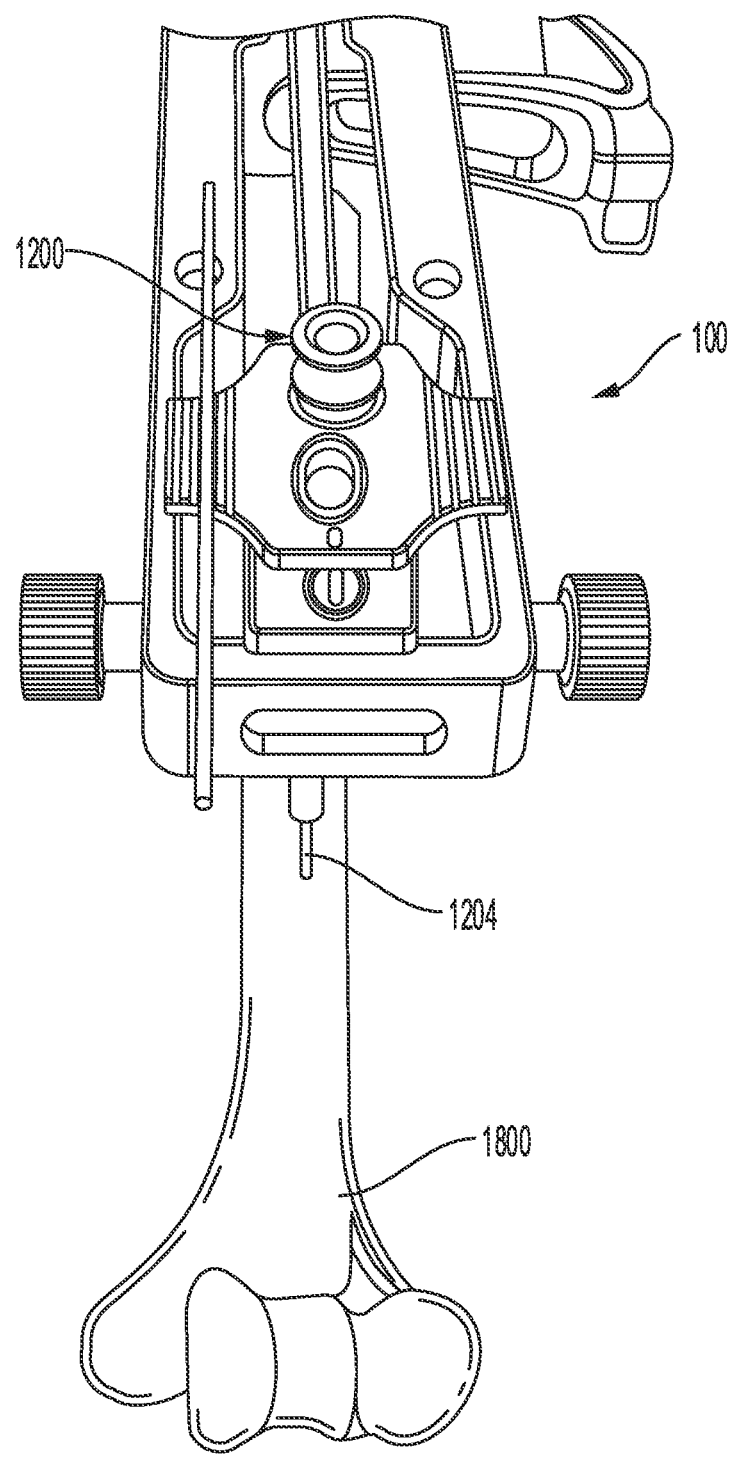
FIG. 18 illustrates a perspective view of a targeting marker of FIG. 12 positioned near a humerus, according to an aspect of the present disclosure.
Figure 19:
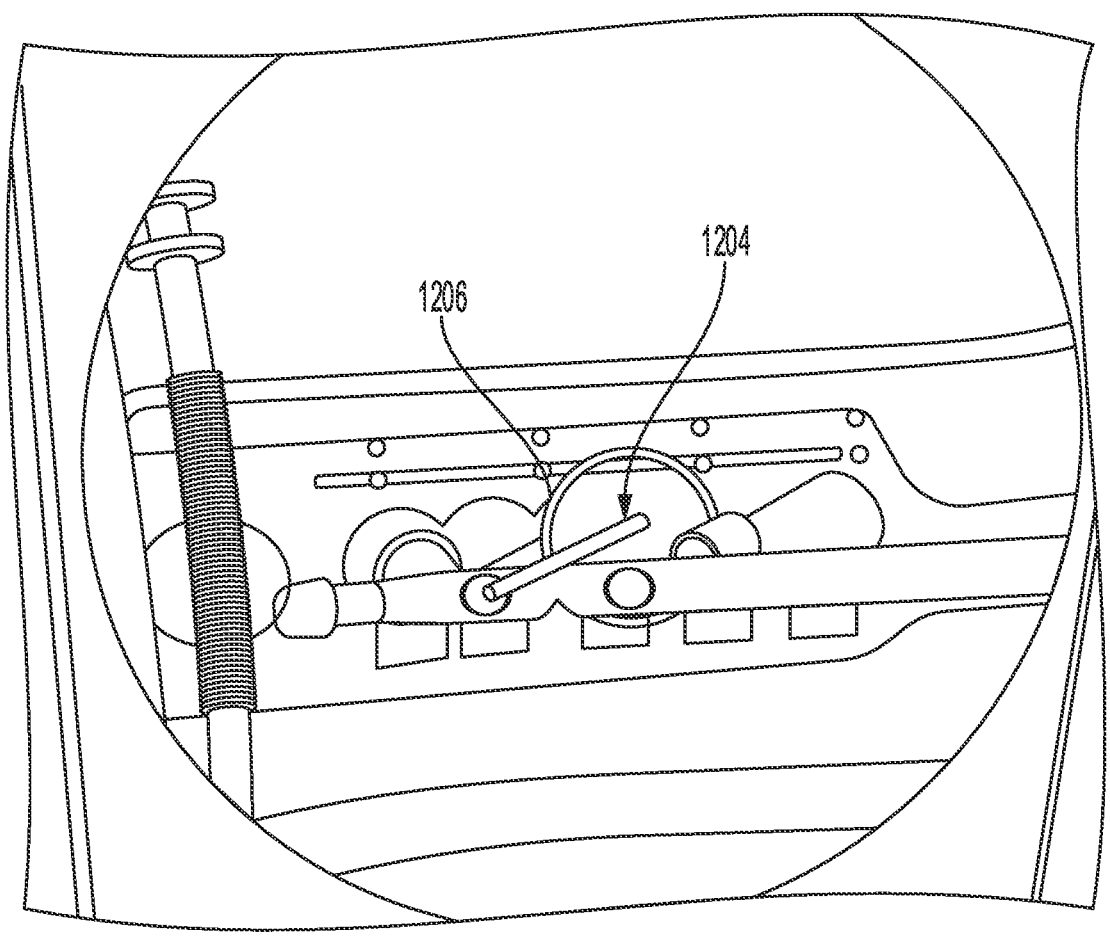
FIG. 19 illustrates a fluoroscopy image showing the radiopaque rod and radiopaque ring of the targeting marker of FIG. 12, according to an aspect of the present disclosure.

In some aspects, aligning the targeting device 100 includes using targeting marker(s) (e.g., one or more targeting markers 1200) when adjusting the targeting device 100. A surgeon may insert a targeting marker 1200 into one or both of the cannula holes 400 and 404. FIG. 18 illustrates a representation of a targeting marker 1200 inserted into the cannula hole 400 of the targeting device 100 with a tip of the radiopaque core 1204 near a humerus 1800. FIG. 19 illustrates a fluoroscopy image showing the radiopaque core 1204 and the radiopaque ring 1206 of the targeting marker 1200. The surgeon may utilize the radiopaque ring 1206 on the fluoroscopic image to understand which end of the radiopaque core 1204 is where. In such aspects of using one or more targeting markers 1200, once the targeting block 210 is aligned to the screw holes 124A and 124B of the nail 108, the one or more targeting markers 1200 may be removed from the targeting block 210 and the targeting cannulas 112A and 112B may be inserted for drilling.

With the targeting block 210 properly aligned, regardless of the alignment method used, the surgeon may insert the targeting cannulas 112A and 112B in the cannula holes 400 and 404, if the targeting cannulas 112A and 112B have not already been inserted. In some instances, the surgeon could insert the targeting cannulas 112A and 112B prior to the targeting block 210 being in final alignment. The surgeon may then drill bone holes into the humerus of the patient 1300 through the targeting cannula 112A or 112B. Each drilled bone hole is coaxial, or substantially coaxial, with its corresponding screw hole 124A or 124B.

In some aspects, once the bone holes are prepared for the medial/lateral plane, the surgeon may install the bone screws into the prepared bone holes and corresponding screw holes 124A and 124B of the installed nail 108. In other aspects, the surgeon may prepare the bone holes for the anterior/posterior plane prior to installing any bone screws. To prepare the bone holes for the anterior/posterior plane, the surgeon may adjust the targeting device 100. For instance, in some aspects, the surgeon may decouple the targeting device 100 from the installed nail 108 (e.g., by removing the lag bolt 122). With the targeting device 100 decoupled, the surgeon may add the connector bow 106. For instance, the surgeon may decouple the base plate 104 from the targeting body 102, couple the connector bow 106 to the targeting body 102, and couple the base plate 104 to the connector bow 106. The surgeon may then again couple the targeting device 100 to the installed nail 108.

With the targeting device 100 in position for bone hole preparation in the anterior/posterior plane, the surgeon may align the targeting device 100 in a similar manner as described above for the medial/lateral plane and drill bone holes into the humerus of the patient 1300 that are coaxial with the screw holes 126A and 126B respectively. At this point, the surgeon may install bone screws into each of the prepared bone holes in the medial/lateral plane and the anterior/posterior plane, or only in the anterior/posterior plane. With the nail 108 installed having a bone screw through each of its screw holes 124A, 124B, 126A, and 126B, the surgeon may complete any final steps to finish up the procedure (e.g., closing up the patient).

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A targeting device for aiding in the installation of a screw through a distal end of a nail installed in a bone of a patient, wherein a proximal end of the nail is disposed near an insertion point of the nail into the bone and the distal end of the nail is disposed away from the insertion point, the targeting device comprising:
   a targeting body including:
      an outer frame,
      a flexible member connected to the outer frame,
      a targeting block connected to the flexible member such that the flexibility of the flexible member enables the targeting block to translate towards a first side of the outer frame and a second side of the outer frame, the first side being opposite the second side, and wherein the targeting block includes a plurality of holes, and
      an adjustment assembly configured to adjust and maintain a position of the targeting block relative to the first and second sides of the outer frame,
      wherein the adjustment assembly includes:
         a rod having a first threading,
         a component arranged in one hole of the plurality of holes of the targeting block, wherein the component includes an opening, the opening including a second threading,
         wherein the rod is positioned through the opening of the component and an opening of the targeting block, the rod arranged to engage the second threading such that rotation of the rod adjusts the position of the targeting block; and
   a base plate removably coupled to the targeting body, the targeting device configured such that the base plate may be coupled to the nail.

2. The targeting device of claim 1, further comprising a curved connector bow, wherein the base plate is removably coupled to the targeting body via the curved connector bow such that a central plane of the curved connector bow is substantially perpendicular to a central plane of the targeting body and a central plane of the base plate is substantially perpendicular to the central plane of the curved connector bow.

3. The targeting device of claim 1, wherein the nail is substantially parallel to the targeting body when coupled to the base plate.

4. The targeting device of claim 1, further comprising a removable targeting cannula configured to be positioned through a hole of the targeting body, the removable targeting cannula configured to guide a drill bit.

5. The targeting device of claim 1, further comprising a removable insert adapted to be positioned against the targeting block such that the removable insert blocks access to some of the plurality of holes of the targeting block while allowing access to the remaining, non-blocked holes.

6. The targeting device of claim 1, further comprising a magnet arranged adjacent to at least one of the plurality of holes.

7. The targeting device of claim 6, wherein the magnet is embedded within the targeting block.

8. The targeting device of claim 1, wherein the flexible member is a leaf spring.

9. The targeting device of claim 1, further comprising radiopaque components embedded within the targeting block.

10. The targeting device of claim 9, wherein the radiopaque components include a first set of radiopaque components arranged in a first line, a second set of radiopaque components arranged in a second line parallel to the first line, and a third radiopaque component arranged parallel to the first and second lines.

11. The targeting device of claim 10, wherein the first and second sets of radiopaque components are arranged in a first plane, and wherein the third radiopaque component is arranged in a second plane spaced apart from the first plane.

12. A method for installing a screw through a distal end of a nail installed in a bone of a patient, wherein a proximal end of the nail is disposed near an insertion point of the nail into the bone and the distal end of the nail is disposed away from the insertion point, the method comprising:
   installing the nail into the bone of the patient, the nail including a screw hole at the distal end of the nail;
   coupling the targeting device of claim 1 to the proximal end of the nail;
   aligning the coupled targeting device with the aid of fluoroscopy such that one of the holes of the targeting block is targeted at the screw hole at the distal end of the nail;
   drilling a bone hole in the bone such that the drilled bone hole is aligned with the screw hole at the distal end of the nail; and
   installing a screw in the screw hole.

13. The method of claim 12, wherein aligning the targeting device includes inserting a targeting marker in the one of the holes of the targeting block such that an end of the targeting marking is adjacent the bone, and wherein the end of the targeting marker is radiopaque.

14. The method of claim 12, further comprising coupling a straight radiopaque component to the targeting device, and wherein aligning the targeting device includes adjusting the targeting device until the coupled straight radiopaque component and the installed nail are substantially parallel on a fluoroscopy image.

15. The method of claim 12, wherein the targeting block includes a first row of radiopaque components, a second row of radiopaque components parallel to the first row, and a third radiopaque component arranged parallel to the first and second rows, and wherein aligning the targeting device includes adjusting the targeting device until the third radiopaque component is equidistantly between the first and second rows of radiopaque components on a fluoroscopy image.

16. A system for installing a screw through a distal end of a nail installed in a bone of a patient, wherein a proximal end of the nail is disposed near an insertion point of the nail into the bone and the distal end of the nail is disposed away from the insertion point, the system comprising:
 the nail including a screw hole at the distal end of the nail; and
 a targeting device including:
  a targeting body including:
   an outer frame,
   a flexible member connected to the outer frame,
   a targeting block connected to the flexible member such that the flexibility of the flexible member enables the targeting block to translate towards a first side of the outer frame and a second side of the outer frame, the first side being opposite the second side, and wherein the targeting block includes a plurality of holes, and
   an adjustment assembly configured to adjust and maintain a position of the targeting block relative to the first and second sides of the outer frame,
  wherein the adjustment assembly includes:
   a rod having a first threading,
   a component arranged in one hole of the plurality of holes of the targeting block, wherein the component includes an opening, the opening including a second threading,
   wherein the rod is positioned through the opening of the component and an opening of the targeting block, the rod arranged to engage the second threading such that rotation of the rod adjusts the position of the targeting block; and
  a base plate removably coupled to the targeting body, the targeting device configured such that the base plate may be coupled to the nail.

17. The system of claim 16, further comprising a straight component, wherein the targeting device is configured to couple the straight component to the targeting device.

18. The system of claim 17, wherein the targeting device further includes a removable insert adapted to be partially inserted within at least one of the plurality of holes of the targeting block, and wherein the removable insert is configured to couple the straight component to the removable insert.

* * * * *